United States Patent
Cao et al.

(10) Patent No.: US 11,513,609 B2
(45) Date of Patent: Nov. 29, 2022

(54) REMOTING OR LOCALIZING TOUCH GESTURES

(71) Applicant: Citrix Systems, Inc., Fort Lauderdale, FL (US)

(72) Inventors: Lin Cao, Fort Lauderdale, FL (US); Ian Russell Wesley, Parkland, FL (US); Bassam El Faourie, Fort Lauderdale, FL (US); Dimitri Tyryshkin, Fort Lauderdale, FL (US); Venu Gopal Nathani, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/550,111

(22) Filed: Dec. 14, 2021

(65) Prior Publication Data
US 2022/0107688 A1    Apr. 7, 2022

Related U.S. Application Data

(63) Continuation of application No. 16/941,664, filed on Jul. 29, 2020, now Pat. No. 11,209,910, which is a
(Continued)

(51) Int. Cl.
*G06F 3/0488* (2022.01)
*G06F 3/0481* (2022.01)
(Continued)

(52) U.S. Cl.
CPC ............ *G06F 3/017* (2013.01); *G06F 3/0481* (2013.01); *G06F 3/0488* (2013.01);
(Continued)

(58) Field of Classification Search
CPC ...... G06F 3/017; G06F 3/0481; G06F 3/0488; G06F 3/04883; G06F 9/44; G06F 2203/04806
See application file for complete search history.

(56) References Cited

U.S. PATENT DOCUMENTS 7,870,496 B1   1/2011  Sherwani
8,046,695 B2  10/2011  Ye et al.
(Continued)

FOREIGN PATENT DOCUMENTS

CN   201181467 Y    1/2009
EP      1942401 A1   7/2008
WO   2009158685 A2  12/2009

OTHER PUBLICATIONS

Moon Soo Lee et al., Remote Collaboration Screen Control Using Mobile Multi-Touch Interface, Oct. 1, 2012, IEEE Xplore, pp. 272-273 (Year: 2012).*
(Continued)

*Primary Examiner* — Tam T Tran
(74) *Attorney, Agent, or Firm* — Banner & Witcoff, Ltd.

(57) ABSTRACT

Aspects of the present disclosure are directed towards responding to a touch gesture at a touch-enabled computing device. An interface control element may be presented at a first computing environment provided by a computing device. A touch gesture may be received at a touchscreen of the computing device, and it may be determined whether at least a portion of the touch gesture occurred at the interface control element. Based, at least in part, on whether at least a portion of the touch gesture occurred at the interface control element, a display of the first computing environment may be adjusted or information corresponding to the touch gesture may be transmitted to a second computing environment. The interface control element may be a preview pane.

33 Claims, 22 Drawing Sheets

Related U.S. Application Data continuation of application No. 16/227,064, filed on Dec. 20, 2018, now Pat. No. 10,754,436, which is a continuation of application No. 14/152,355, filed on Jan. 10, 2014, now Pat. No. 10,180,728.

(60) Provisional application No. 61/824,771, filed on May 17, 2013.

(51) Int. Cl.
    *G06F 3/01*      (2006.01)
    *G06F 3/04883*   (2022.01)
    *G06F 9/44*      (2018.01)

(52) U.S. Cl.
    CPC ............ G06F 3/04883 (2013.01); G06F 9/44 (2013.01); *G06F 2203/04806* (2013.01)

(56) References Cited

U.S. PATENT DOCUMENTS

| | | | |
|---|---|---|---|
| 8,738,814 B1 * | 5/2014 | Cronin | G06F 3/03543 |
| | | | 710/5 |
| 8,745,280 B1 | 6/2014 | Cronin | |
| 2003/0179240 A1 | 9/2003 | Gest | |
| 2004/0133428 A1 | 7/2004 | Brittan et al. | |
| 2007/0262964 A1 | 11/2007 | Zotov et al. | |
| 2008/0165141 A1 | 7/2008 | Christie | |
| 2009/0125824 A1 | 5/2009 | Andrews et al. | |
| 2009/0140986 A1 | 6/2009 | Karkkainen et al. | |
| 2009/0292989 A1 | 11/2009 | Matthews et al. | |
| 2010/0268828 A1 | 10/2010 | Pahlavan et al. | |
| 2010/0269152 A1 | 10/2010 | Pahlavan et al. | |
| 2010/0277337 A1 | 11/2010 | Brodersen et al. | |
| 2011/0214063 A1 | 9/2011 | Saul | |
| 2011/0246891 A1 | 10/2011 | Schubert et al. | |
| 2011/0246904 A1 | 10/2011 | Pinto et al. | |
| 2012/0044157 A1 | 2/2012 | Chen | |
| 2012/0050336 A1 | 3/2012 | Nave et al. | |
| 2012/0054671 A1 * | 3/2012 | Thompson | G06F 3/04883 |
| | | | 715/863 |
| 2012/0084663 A1 | 4/2012 | Momchilov et al. | |
| 2012/0092277 A1 * | 4/2012 | Momchilov | G09G 5/003 |
| | | | 345/173 |
| 2012/0192078 A1 | 7/2012 | Bai et al. | |
| 2012/0216154 A1 * | 8/2012 | Li | H04N 21/42224 |
| | | | 715/863 |
| 2012/0266079 A1 | 10/2012 | Lee et al. | |
| 2013/0111391 A1 | 5/2013 | Penner et al. | |
| 2013/0212486 A1 | 8/2013 | Joshi et al. | |
| 2013/0290856 A1 | 10/2013 | Beveridge et al. | |
| 2013/0290858 A1 | 10/2013 | Beveridge | |
| 2015/0026586 A1 | 1/2015 | Nylund et al. | |
| 2016/0249106 A1 | 8/2016 | Lachwani et al. | |

OTHER PUBLICATIONS

Andreas Lorenz et al., A Formative Analysis of Mobile Devices and Gestures to Control a Multimedia Application from the Distance, Apr. 1, 2010, IEEE Xplore, pp. 796-801 (Year: 2010).*

Mar. 24, 2002 (EP) Examination Report—App. No. 20160558.1.

International Search Report and Written Opinion, PCT/US2014/038410, dated Aug. 25, 2014.

Apr. 7, 2016—U.S. Non-final Office Action—U.S. Appl. No. 14/152,355.

Oct. 4, 2016—U.S. Final Office Action—U.S. Appl. No. 14/152,355.

Feb. 23, 2017—U.S. Non-Final Office Action—U.S. Appl. No. 14/152,355.

Sep. 1, 2017 U.S. Final Office Action—U.S. Appl. No. 14/152,355.

Mar. 5, 2018—(CN) First Office Action—201480038758.2.

Apr. 12, 2018—U.S. Non-Final Office Action—U.S. Appl. No. 14/152,355.

Aug. 31, 2018—U.S. Notice of Allowance and Fee(s) Due—U.S. Appl. No. 14/152,355.

Oct. 30, 2018—(EP) Examination Report—App 14730379.6.

Oct. 31, 2019—U.S. Non-final Office Action—U.S. Appl. No. 16/227,064.

Jun. 23, 2020—(EP) Extended European Search Report—App. No. 20160558.1.

Bill Kapralos, et al., "Recognition of Hand Raising Gestures for a Remote Learning Application," Jun. 1, 2007, IEEE Computer Society, pp. 1-4, 2007.

Thiago Motta et al., "Deviceless Gestural Interaction for Public Displays," May 1, 2013, IEEE Xplore, pp. 175-184, 2013.

Aug. 24, 2021—U.S. Notice of Allowance—U.S. Appl. No. 16/941,664.

* cited by examiner

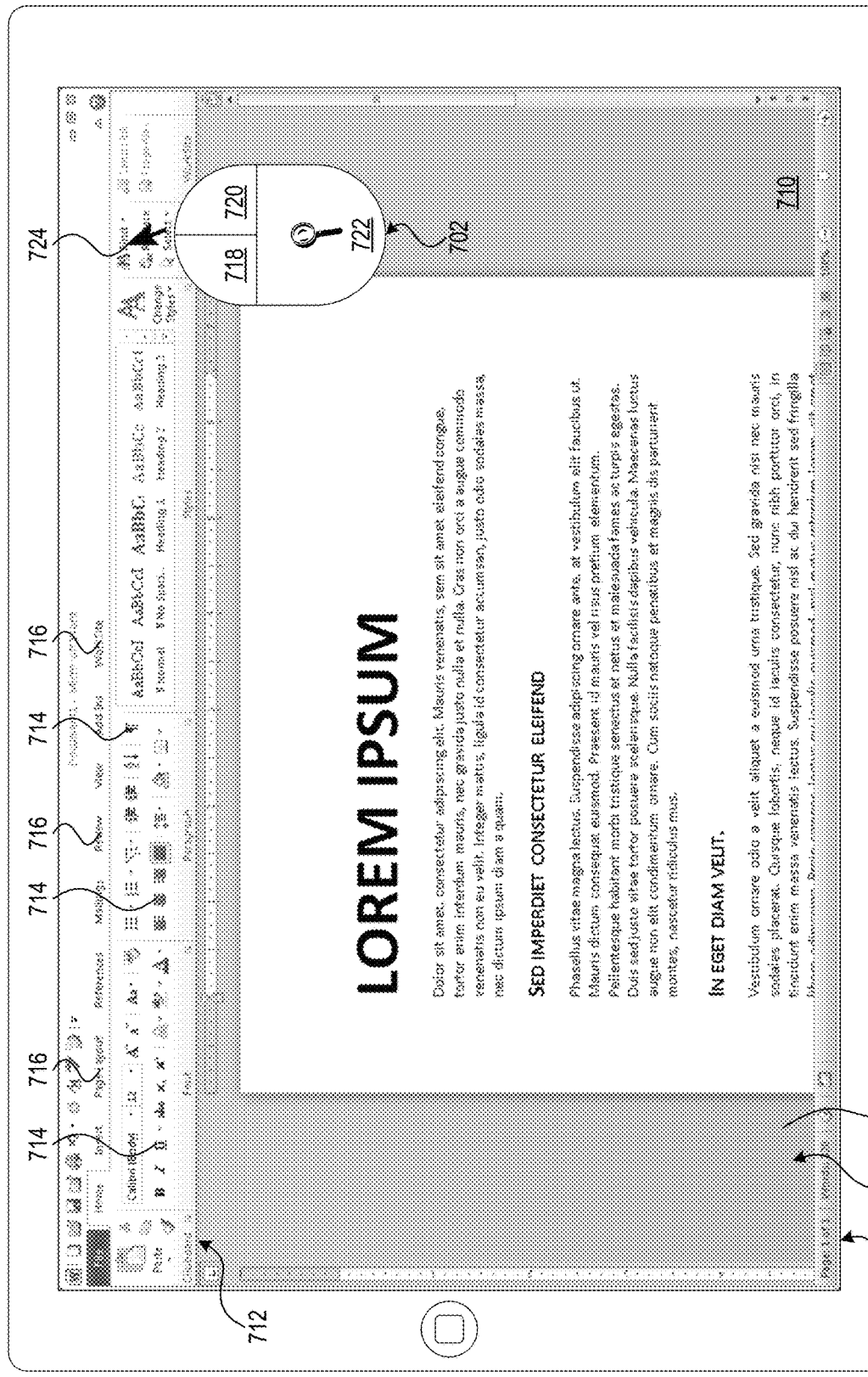

REMOTING OR LOCALIZING TOUCH GESTURES

CROSS-REFERENCE TO RELATED APPLICATIONS

This application is a continuation of U.S. patent application Ser. No. 16/941,664 entitled "REMOTING OR LOCALIZING TOUCH GESTURES AT A VIRTUALIZATION CLIENT AGENT" and filed on Jul. 29, 2020, which is a continuation of U.S. patent application Ser. No. 16/227,064 entitled "REMOTING OR LOCALIZING TOUCH GESTURES AT A VIRTUALIZATION CLIENT AGENT" and filed on Dec. 20, 2018, now U.S. Pat. No. 10,754,436, which is a continuation of U.S. patent application Ser. No. 14/152,355 entitled "REMOTING OR LOCALIZING TOUCH GESTURES AT A VIRTUALIZATION CLIENT AGENT" and filed on Jan. 10, 2014, now U.S. Pat. No. 10,180,728, which claims the benefit of U.S. Provisional Patent Application No. 61/824,771 entitled "REMOTING OR LOCALIZING TOUCH GESTURES AT A VIRTUALIZATION RECEIVER" and filed on May 17, 2013, each of which is incorporated by reference herein its entirety herein.

BACKGROUND

A computing device may be touch-enabled such that a user provides input via touch gestures at a touchscreen of the device. Those familiar with touch-enabled devices will appreciate that a user may execute various functions by performing particular motions on the touchscreen. Examples of touch gestures include a tap gesture, a double-tap gesture, a long press gesture, a scroll gesture, a pan gesture, a flick gesture, a pinch gesture, and so forth. The operating system of the device may interpret the gesture to identify the type of gesture performed, and provide the gesture information to an application at the device. The application may pair a touch gesture with a particular function that executes upon receipt of the touch gesture. In one example, an application may pair a pinch open gesture with a zoom in function and pair a pinch close gesture with a zoom out function. As another example, an application may pair a pan gesture with a pan function that pans the display at the application or device. In these examples, the touch gestures are interpreted and responded to natively by the operating system of the device or an application running locally at the device.

Recent advances in virtualization technology, however, allow touch-enabled computing devices to access virtualized applications operating remotely relative to the device. With this technology, a user may interact with the virtualized application as if it were running natively at the computing device. Many of the virtualized applications may be designed for execution at a desktop computing device in which a user utilizes a pointing device such as a mouse to provide input. A physical pointing device may allow for more precise control and selection at the application. As a result, the graphical user interfaces of these applications may include relatively small icons, menus, and other graphical user interface elements suitable for selection using precision pointing devices.

The touchscreen of a touch-enabled device, however, may not provide the precision necessary to select these relative small graphical user interface elements. Accordingly, one challenge to presenting virtualized applications at a touch-enabled devices involves accurately interpreting a touch gesture to provide a desired response. Another challenge to presenting virtualized applications at a touch-enabled device involves determining whether a touch gesture should be interpreted locally at the native environment or remotely at the virtualized environment. Users may interact with both the native operating system and the virtualized application using touch gestures. In some circumstances, the user may desire the native environment to respond to the touch gesture, while in other circumstances the user may desire the virtualized application to respond to the touch gesture. Some proposed solutions require the user to activate and deactivate gesture modes such that a touch gesture is interpreted locally when one mode is active and interpreted remotely when another mode is active. Such proposed solutions, however, diminish the user experience through the extra effort required to switch between modes.

In view of these challenges, new approaches to interpreting and responding to touch gestures in the virtualization context are needed. In particular, accurately interpreting touch gestures for virtualized applications and distinguishing between for local or remote interpretation are needed.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a method of responding to a touch gesture at a touch-enabled computing device. An interface control element may be presented at a first computing environment provided by a computing device. A touch gesture may be received at a touchscreen of the computing device, and it may be determined whether at least a portion of the touch gesture occurred at the interface control element. Based, at least in part, on whether at least a portion of the touch gesture occurred at the interface control element, a display of the first computing environment may be adjusted or information corresponding to the touch gesture may be transmitted to a second computing environment.

A second aspect described herein provides a touch-enabled computing device comprising a touchscreen, a first computing environment, and interface control element and a client agent. The interface control element is presentable at the first computing environment. The client agent may be configured to determine whether at least a portion of a touch gesture received at the touchscreen occurred at the interface control element. The client agent may also be configured to, based at least in part on whether at least a portion of the touch gesture occurred at the interface control element, adjust a display of the first computing environment or transmit information corresponding to the touch gesture to a second computing environment.

A third aspect described herein provides non-transitory computer-readable media having instructions executable by a processor of a computing device. When executed by the processor of the computing device, the instructions may cause the computing device to present an interface control element at a first computing environment and receive a touch gesture at a touchscreen of the computing device. The computing device may determine whether at least a portion of the touch gesture occurred at the interface control element. Responsive to a determination that no portion of the touch gesture occurred at the interface control element, the computing device may transmit information corresponding to the touch gesture to a second computing environment provided by another computing device located remotely relative to the computing device. The touch gesture information may include at least one of a set of coordinates corresponding to one or more locations of the touchscreen at which the touch gesture occurred, a state of the touch gesture, a duration of the touch gesture, a value quantifying a pressure of the touch gesture, and combinations thereof.

Responsive to a determination that a first portion of a pinch open touch gesture occurred at the interface control element and a second portion of a pinch open touch gesture did not occur at the interface control element, the computing device may increase a zoom level of a display of the first computing environment. Responsive to a determination that a first portion of a pinch close touch gesture occurred at the interface control element and a second portion of a pinch close touch gesture did not occur at the interface control element, the computing device may decrease a zoom level of the display. Responsive to a determination that a double-tap touch gesture occurred at the interface control element when the zoom level of the display is at or below 100%, the computing device may increase the zoom level of the display. Responsive to a determination that a double-tap touch gesture occurred at the interface control element when the zoom level of the display is above 100%, the computing device may decrease the zoom level of the display. Responsive to a determination that a pan touch gesture occurred at the interface control element, the computing device may pan the display of the first computing environment in the direction of the pan touch gesture.

Additional aspects will be appreciated with the benefit of the additional description provided in further detail below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

FIG. 7A depicts an example of an interface with a second type of interface control that may be used in accordance with aspects of the present invention.

DETAILED DESCRIPTION

Figure 1:
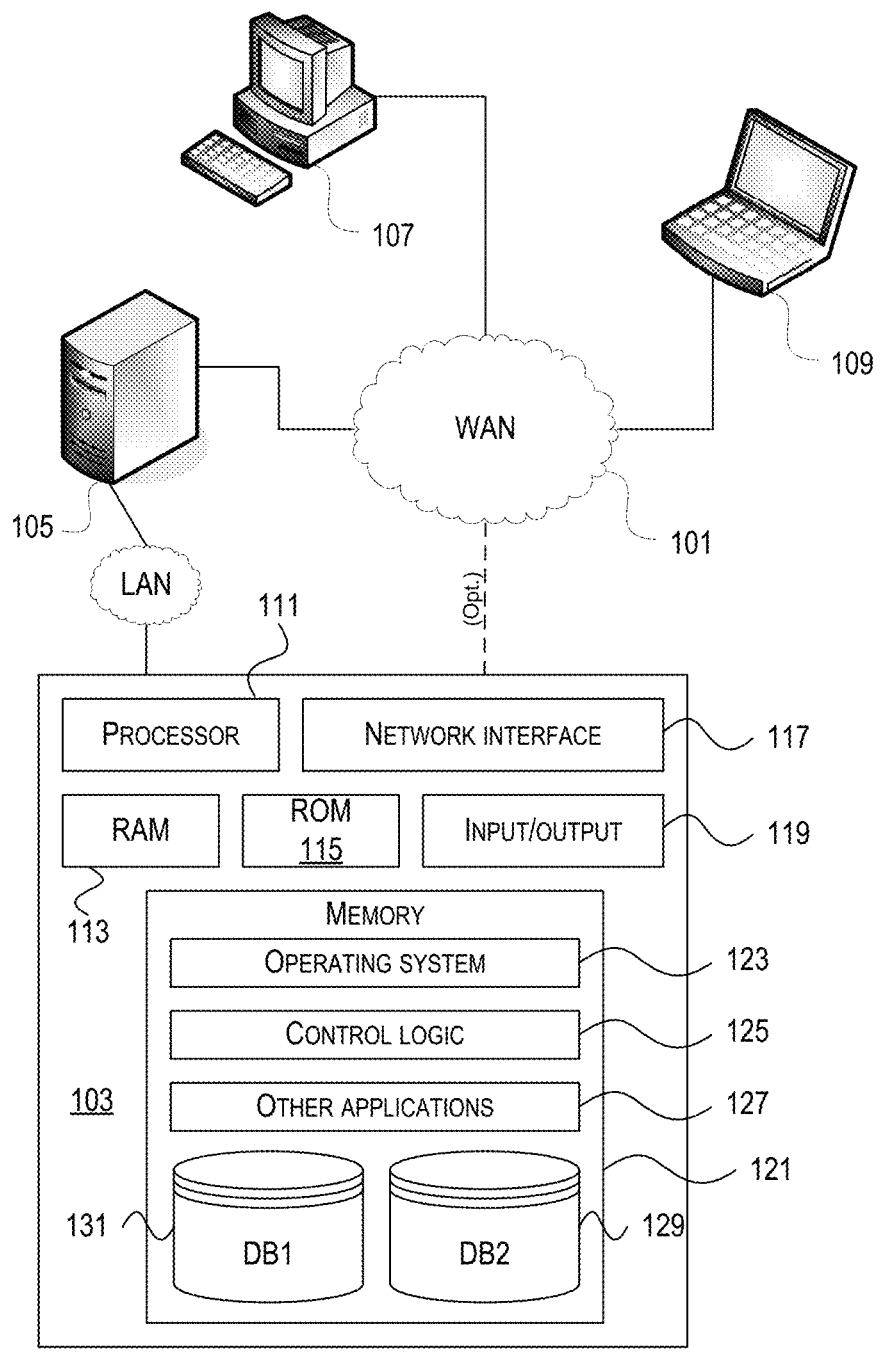
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described are directed towards interpreting and responding to touch gestures received at a touch-enabled device during a virtualization session. In particular, the present disclosure describes approaches to distinguishing between touch gestures that should be interpreted and responded to locally at the native environment of the device and touch gestures that should be interpreted and responded to at a virtualized environment. As described in further detail below, touch gesture information may be provided to the virtual environment for interpretation. Providing touch gesture information from the touch-enabled device to the virtual environment may be referred to as "remoting" the touch gesture to the virtual environment. Aspects of the present disclosure are described in the context of a virtual environment located on another computing device that is located remotely relative to the touch-enabled computing device. It will be appreciated, however, that the virtual environment may also be located on the same computing device as the native environment. As discussed further below, a client agent operating in the native environment may provide access to the virtual environment during a virtualization session. Furthermore the native environment may be provided by an operating system at the computing device and the virtual environment may be provided by a virtualization application operating within the native environment or operating at a remote computing device, e.g., a virtualization server.

As also described further below, aspects of the present disclosure describe various types of control elements for receiving touch gestures when interacting with the touch-enabled device and the virtualized application. As used herein a touch-enabled computing device refers to a computing device that includes a touchscreen. A touchscreen refers to an electronic visual output device capable of receiving input from a user via one or more of a finger of the user, a stylus, or other objects detectable by the touchscreen. Through various touch gestures, a user may interact with objects of an interface presented at the touchscreen. Such objects may include, e.g., windows, dialogs, icons, text, and other interface-related objects that will be appreciated with the benefit of this disclosure. When a touch gesture is interpreted locally only the visual output of the native display may change in response to the touch gesture; the visual output of the virtual display may not change for a touch gesture interpreted locally. When a touch gesture is remoted and interpreted remotely, the visual output of the virtual display may change in response to the touch gesture, and because the native display of the computing device presents the visual output of the virtual display, the visual output of the native display may change as a result of the changes to the visual output of the virtual display.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system configurations, including standalone, networked, remote-access (aka, remote desktop), virtualized, and/or cloud-based configurations, among others. FIG. 1 illustrates one example of a system architecture and data processing device that may be used to implement one or more illustrative aspects of the disclosure in a standalone and/or networked configuration. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
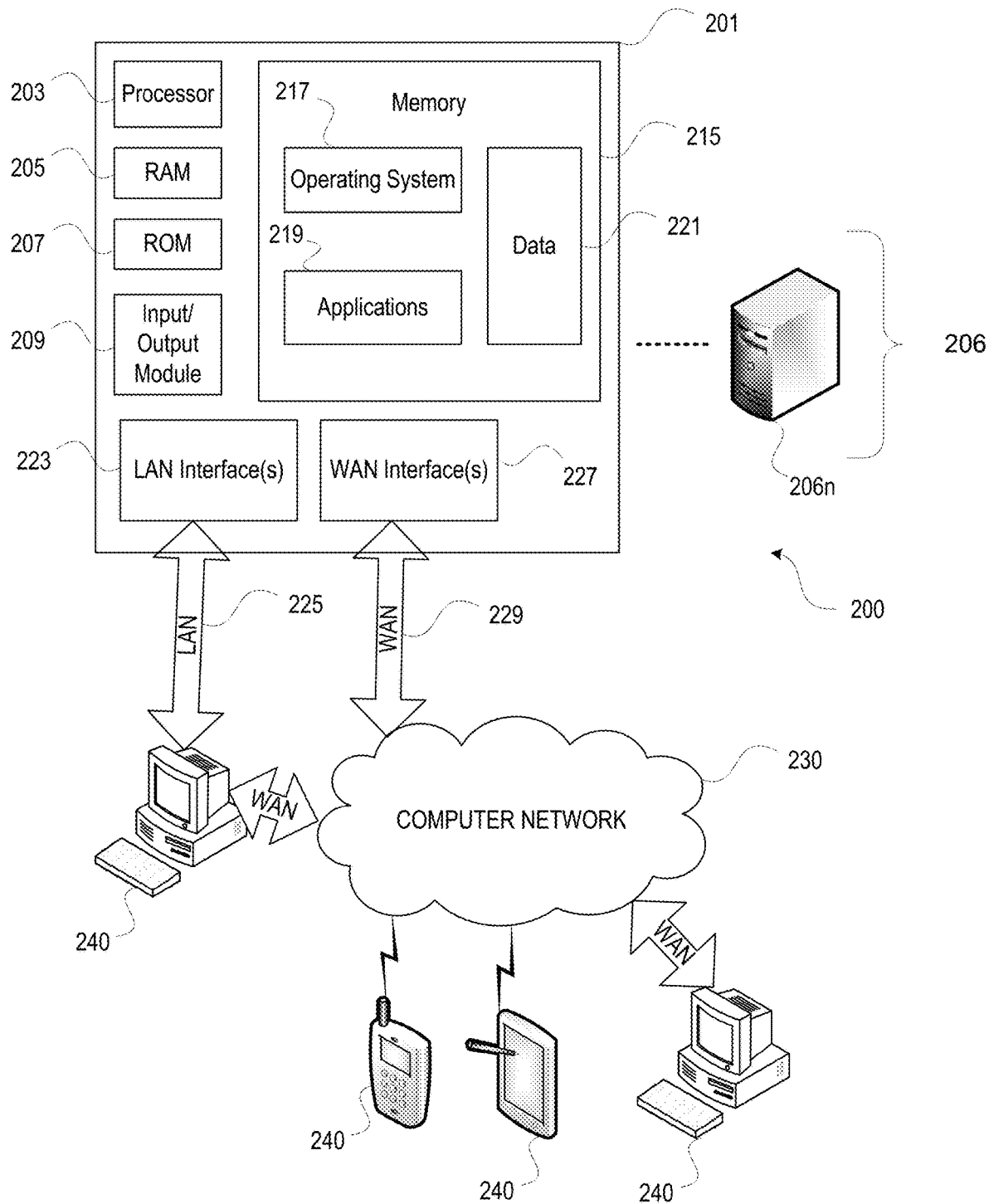
FIG. 2 depicts an illustrative remote-access system architecture that may be used in accordance with one or more illustrative aspects described herein.

With further reference to FIG. 2, one or more aspects described herein may be implemented in a remote-access configuration. FIG. 2 depicts an example system architecture including a generic computing device 201 in an illustrative computing configuration 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked configuration supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking configuration, computing device 201 may be connected to the LAN 225 through a network interface or adapter 223. When used in a WAN networking configuration, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system contexts or configurations. Examples of other computing systems, contexts, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing configurations that include any of the above systems or devices, and the like.

As shown in FIG. 2, one or more client devices 240 may be in communication with one or more servers 206a-206n (generally referred to herein as "server(s) 206"). In one embodiment, the computing configuration 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing configuration may include more than one server 206a-206n such that the servers 206a-206n are logically grouped together into a server farm 206, for example, in a cloud computing configuration. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
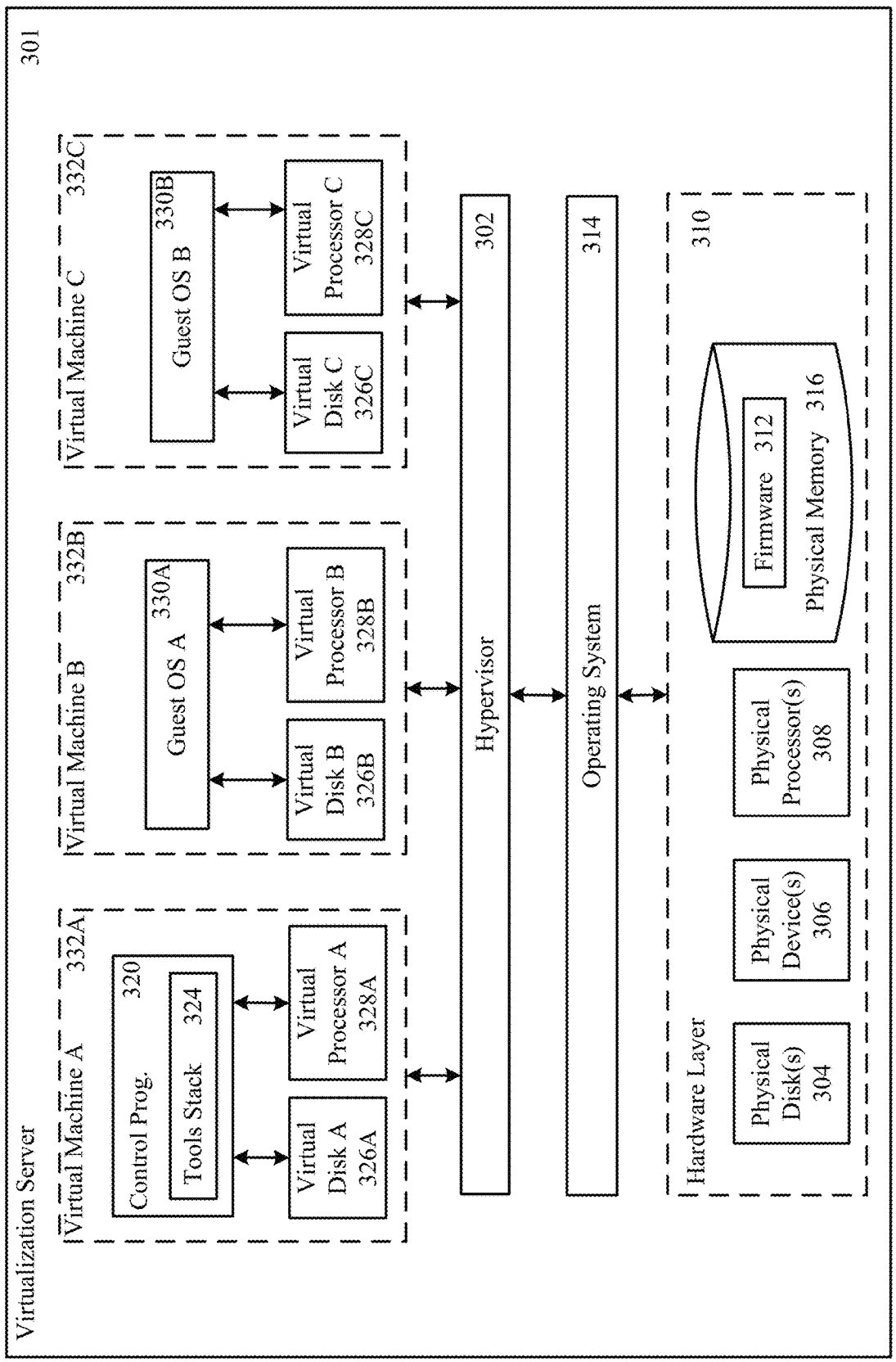
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization configuration, for example, a single-server, multi-server, or cloud computing configuration. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization configuration may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
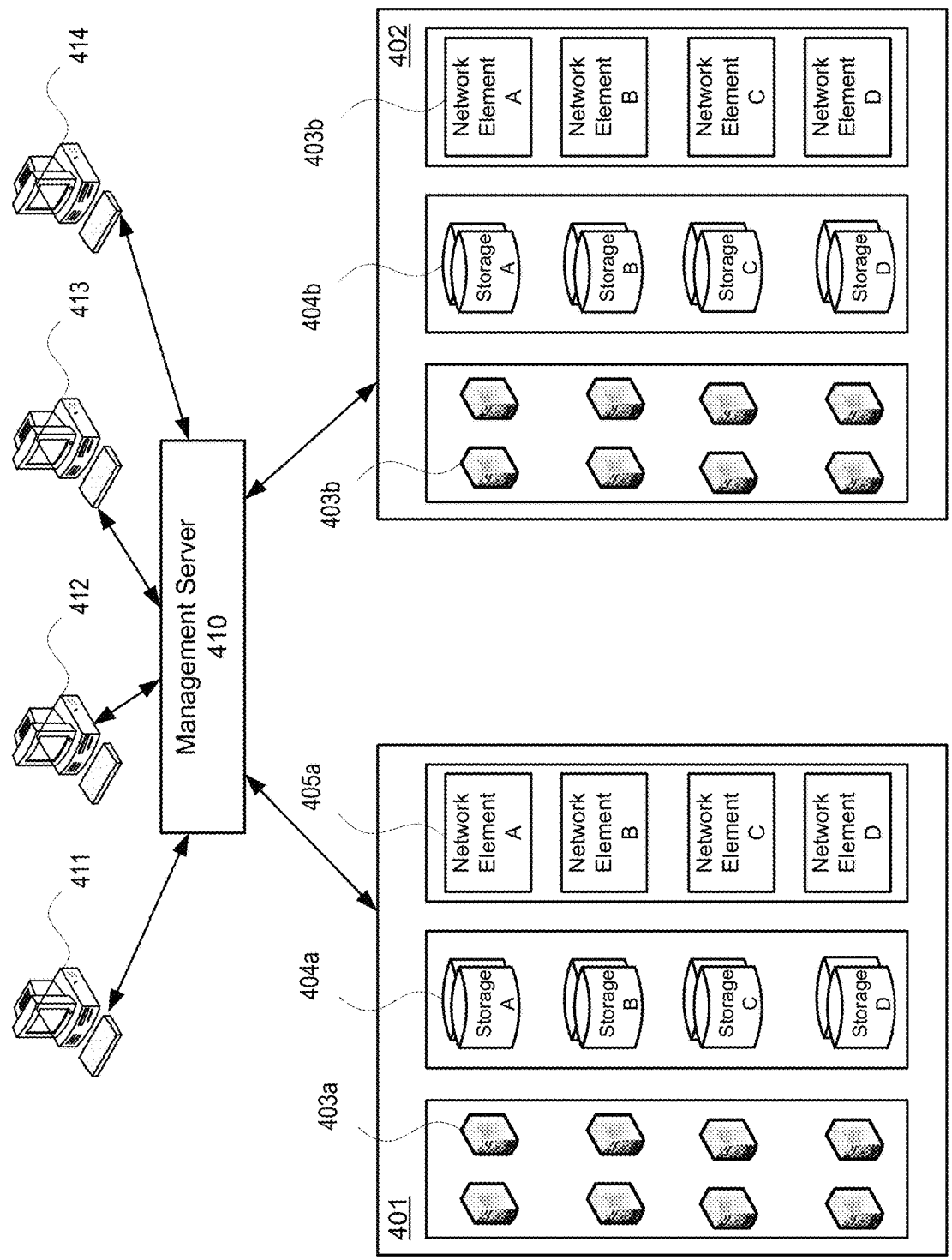
FIG. 4 depicts an illustrative cloud-based system architecture that may be used in accordance with one or more illustrative aspects described herein.

With further reference to FIG. 4, some aspects described herein may be implemented in a cloud-based configuration. FIG. 4 illustrates an example of a cloud computing configuration (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing configuration, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing configuration shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Virtualization System for Localizing or Remoting Touch Gestures

Figure 5:
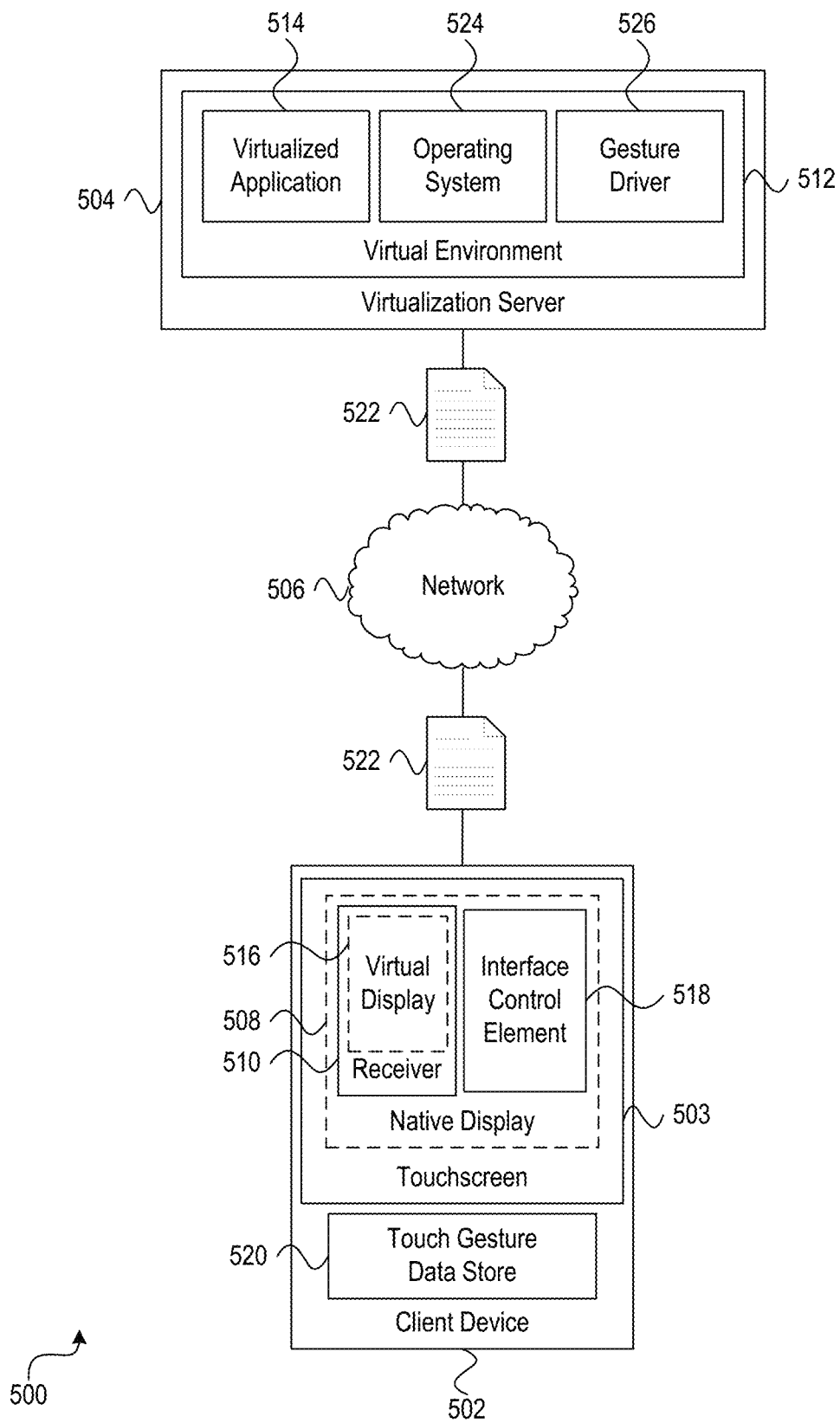
FIG. 5 depicts an example of an implementation of a virtualization system in accordance with aspects of the present disclosure.

FIG. 5 is an example of an implementation of a virtualization system 500 in accordance with aspects of the present disclosure. A client device 502 may be in signal communication with a virtualization server 504 via a network 506 such as the Internet. The client device 502 may be touch-enabled computing device. As noted above, a touch-enabled computing device refers to a computing device capable of receiving user input as touch gestures at a touchscreen 503. The client device 502 may present a graphical user interface (GUI) at a display 508 native to the client device. In the present disclosure, the display 508 native to the client device 502 is referred to as the native display.

A virtualization client agent 510 may reside at the client device 502 that allows a user to access the virtualization server 504. The client agent 510 may be a software application executing on the client device 502 that facilitates communications with remote resources and/or virtualized resources. The client agent 510, in one illustrative embodiment, may be RECEIVER by Citrix Systems, Inc. of Fort Lauderdale, Fla. As described above, the virtualization server 504 may create a virtual environment 512 to launch a virtualized application 514. The client agent 510 may provide a virtual display 516 corresponding to the GUI of the virtualized application 514. It will thus be appreciated that a user may view and interact with the virtual display 516 via the native display 508 of the client device 502.

The client agent 510 is also configured to determine whether a touch gesture should be interpreted locally at the client device 502 or remoted to the virtualization server 504 for interpretation at the virtual environment 512. The client agent 510 may distinguish between touch gestures that should be locally or remotely interpreted using an interface control element 518 presented at the touchscreen 503. The client agent 510 may determine whether the touch gesture should be interpreted locally or remotely based on various criteria associated with the interface control element 518 including whether at least a portion of the touch gesture occurred at the interface control element. In some example implementations, the client agent 510 may determine that a touch gesture should be interpreted locally at the client device 502 when the interface control element 518 has focus. As used in the present disclosure, the interface control element 518 is described to have focus where a touch gesture is received such that a portion of the touch gesture occurs at the interface control element and another portion of the touch gesture does not occur at the interface control element. If the interface control element 518 does not have focus when a touch gesture is received, the client agent 510, in this example, may determine that the touch gesture should be remoted to the virtualization server 504 for remote interpretation at the virtual environment 512. In some example implementations, touch gestures that occur entirely at the interface control element 518 may either be remoted to the virtualization server or interpreted locally depending on, e.g., the type of interface control element. The client agent 510 may also be configured to determine an adjustment to the native display 508 when the touch gesture is interpreted locally. Adjustments to the native display 508 may include, e.g., adjusting a zoom level of the native display or panning the native display when the native display is zoomed in. Adjusting the zoom level of the native display 508 may include adjusting the zoom level such that the zoom level is at 100%, above 100% (zoomed in), or below 100% (zoomed out). The adjustment to the native display may depend on various criteria such as, e.g., the type of touch gesture, the type of interface control element, a target location of the interface control element that received the touch gesture, and combinations of such criteria. These example implementations will be described in further detail below.

The interface control element 518 may be a GUI component layered on top of the GUI of the client agent 510. The interface control element may be associated with one or more gesture recognizers (e.g., UITapGestureRecognizer, UIPanGestureRecognizer, UISwipeGestureRecognizer, and the like) that process a touch gesture received at the touchscreen of the client device 502. The gesture recognizers may invoke various functionality upon recognition of a touch gesture. For example, in response to a tap touch gesture or a pinch touch gesture, the gesture recognizers may invoke a zoom function to adjust a zoom level of the native display 508, e.g., to zoom in or out at the native display. As another example, the gesture recognizers may invoke a panning function to pan the native display 508 in response to recognition of a pan touch gesture. Zooming and panning functionality will be discussed in further detail below. As an additional example, in response to receipt of touch gesture information corresponding to an upward or downward swipe, a virtualized application may scroll the virtual display for the application.

When the interface control element 518 does not have focus while receiving a touch gesture, the touch gesture may be remoted to the virtualization server 504. The client agent 510 may be configured to remote the touch gestures to the virtual environment 512 residing at the virtualization server 504. In order to remote the touch gestures to the virtualization server 504, the client device 502 may include a touch gesture data store 520. The client device 502 may collect touch gesture data 522 as the user provides the touch gestures and store the touch gesture data at the touch gesture data store 520. The client agent 510 may then transmit the touch gesture data 522 to the virtualization server 504, e.g., via the network 506. The touch gesture data 522 may include, e.g., a unique identifier for the touch gesture, the coordinates of the touch gesture (the "touch points"), the touch state (e.g., up, down, moving), the duration of the touch gesture (a "touch time"), and a value quantifying the pressure of the touch gesture. The coordinates of the touch gesture may be a set of coordinates corresponding to one or more locations of the touchscreen at which the touch gesture occurred Having obtained the touch gesture data 522, the client agent 510 may open a virtual tunnel to the virtualization server 504 and tunnel the touch gesture information to the virtualization server. The client agent 510 may respectively transmit touch gesture information to the virtualization server 504 for each touch gesture received at the client device 502. Additionally, the client agent 510 may transmit the touch gesture information sequentially in the order in which the touch gestures are received at the client device 502. The virtualization server 504 may receive the touch gesture data 520 and route the touch gesture data to the virtual environment 512. Accordingly, the touch gesture data 520 may also include information identifying the virtual environment 512 and virtualized application 514 the touch gesture data is associated with and headed toward. The virtualized application 514 may implement the functionality to respond to touch gestures remoted to the virtualization server 504, e.g., selecting an icon or menu command in response to receipt of a tap touch gesture, performing a scroll at the GUI in response to receipt of a scroll touch gesture, zooming the GUI in response to receipt of a pinch touch gesture, and so forth.

In some circumstances, the operating system 524 of the virtual environment 512 may provide a mechanism for injecting touch gesture data, e.g., via appropriate functions calls of an application programming interface (API). In other circumstances, the operating system 524 may not include any mechanisms for injecting touch gesture data. For example, the Windows 8 operating system may provide such a mechanism (e.g., the InjectTouchInput call) to inject touch gesture data while the Windows 7 operating system does not. If the operating system 524 provides a mechanism to inject the touch gesture data 522, then the client agent 510 may simply invoke the appropriate function calls of the operating system API to provide the touch gesture data.

If the operating system 524 does not include any mechanisms to inject touch gesture data, the virtual environment 512 may employ a touch gesture driver 526 (e.g., a "human interface driver") that operates in kernel mode to provide touch gesture data to the operating system. The client agent 510 may invoke the appropriate function calls of the touch gesture driver 526 to provide the touch gesture driver with the touch gesture data 522. The touch gesture driver 526 may receive the touch gesture data 522 from the client agent 510 and pass the touch gesture data to the operating system 524 through the kernel of the operating system 524 running at the virtual environment 512. When the operating system receives the touch gesture data 522 (e.g., via an API function call or through the touch gesture driver), the operating system may pass the touch gesture information to the virtualized application 514. In response to receipt of the touch gesture data 522, the virtualized application 514 may respond according to its particular design and configuration. Like the virtualized application 514, the operating system 524, and the touch gesture driver 526 may be virtualized at the virtual environment 512. Accordingly, the virtualization server 504 may configure the virtual environment 512 to include the touch gesture driver 526 when creating and initializing the virtual environment. Through this approach, the virtualized application 514 may respond to touch gestures as if the virtualized application were running natively at the client device 502.

Virtual Hotspot Interface Control

Figure 6A:
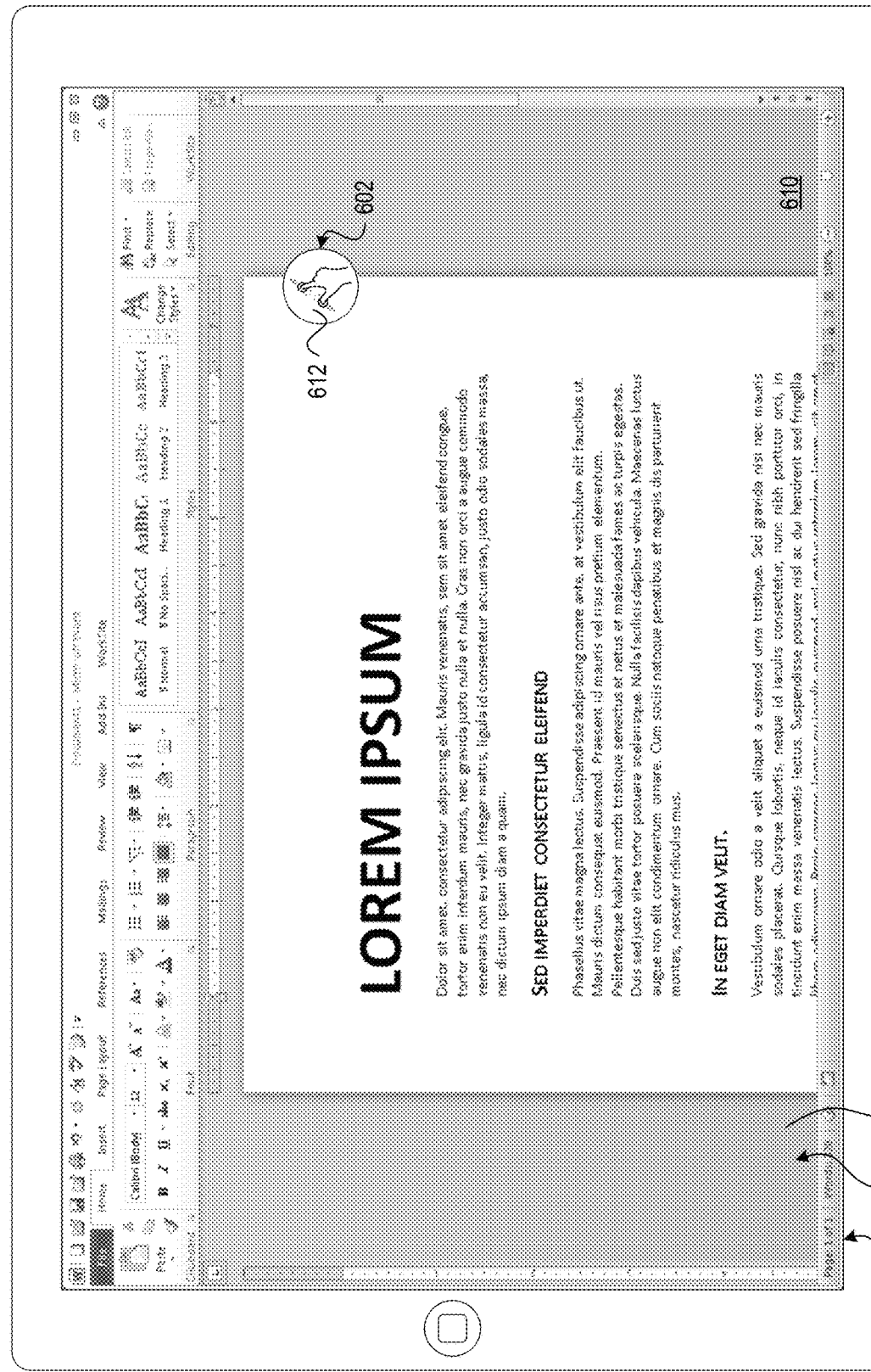
FIG. 6A depicts an example of an interface with a first type of interface control that may be used in accordance with aspects of the present disclosure.

FIG. 6A depicts an example of an interface 600 with a first type of interface control 602 that may be used in accordance with aspects of the present disclosure. As noted above, the interface 600 comprises the native display 604 of the computing device 606 as well as the virtual display 608 of the virtualized application 610. The interface control 602, in this example, may be referred to as a "hotspot." Additionally, a user may utilize the hotspot 602 to zoom in and out at the native display 604. A user may also utilize the hotspot 602 to pan the native display 604 when zoomed in at the native display. The hotspot 602 may be fixed at the native display 604 or the user may be able to reposition the hotspot at the native display, e.g., by dragging the hotspot to a new location at the native display. Furthermore, the hotspot 602, in this example, includes an icon 612 that indicates the type of touch gesture the hotspot is designed to receive. As shown by way of example in FIG. 6A, the icon indicates the hotspot 602 is designed to receive a pinch open touch gesture.

Figure 6B:
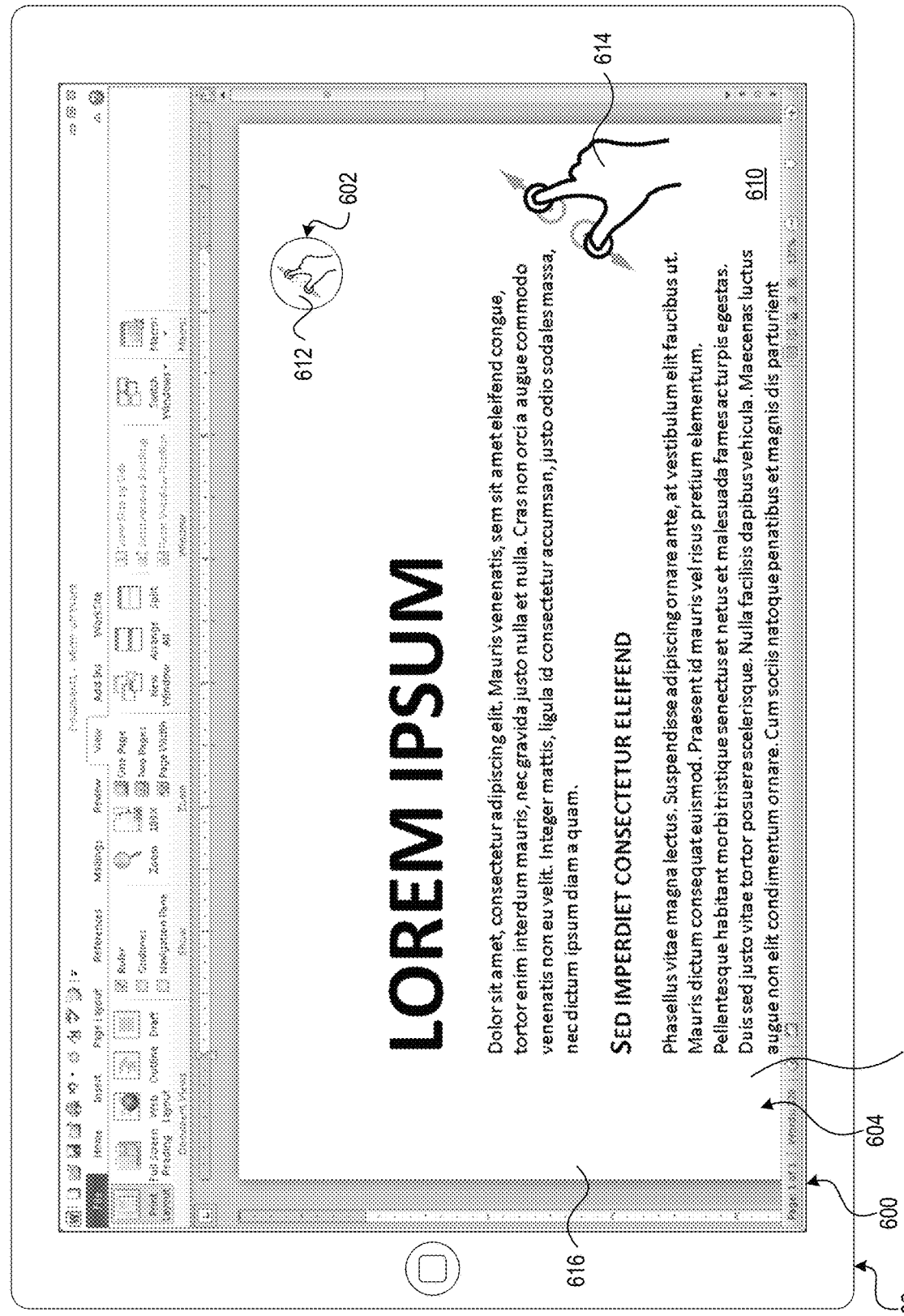
FIG. 6B depicts the interface of FIG. 6A updated in response to a remoted zoom gesture received at the touchscreen.

As noted above, touch gestures may be remoted to a virtualization server when the hotspot 602 does not have focus. FIG. 6B depicts the virtual display 608 of FIG. 6A updated in response to a zoom gesture received at the interface 600 and remoted to the virtualized application 610. As seen in FIG. 6B, a pinch open touch gesture 614 is received at the interface 600 without focus on the hotspot 602. Because the hotspot 602 does not have focus when the interface 600 receives the pinch open touch gesture 614, the client agent, in this example, remotes the pinch open touch gesture to the virtualized application 610. As noted above, the virtualized application 610 implements the functionality to respond to touch gestures. In this example, the virtualized application 610 is a word processing application that adjusts the zoom level of the document view 616 in response to receipt of the remoted pinch open touch gesture 614, e.g., from 100% to 135%. Accordingly the document view 616 is enlarged in response to receipt of the remoted pinch open touch gesture 614 as shown by way of example in FIG. 6B. It will thus be recognized that the pinch open touch gesture 614 of FIG. 6B is interpreted remotely at the virtualized application 610 causing changes to the visual output of the virtual display 608 and, in turn, the visual output of the native display 604. The pinch open touch gesture described with reference to FIG. 6B thus represents a circumstance in which the touch gesture is performed without focus on the hotspot 602 and is remoted as a result.

It will be appreciated that a pinch close gesture provided received at the interface 600 without focus on the hotspot 602 may also be remoted to the virtualized application 610 to zoom out at the document view 616. Additional and alternative types of touch gestures may be remoted to the virtualized application 610 when received without focus on the hotspot 602, e.g., a tap or double-tap touch gesture to select command icons or menus, a scroll touch gesture to scroll or highlight text, etc. It will also be appreciated that other virtualized applications may implement alternative functionality to respond to remoted touch gestures. As another example, the virtualized application may be a document explorer that displays the files contained in a file folder. In response to receipt of a remoted touch gesture (e.g., a pinch open or pinch close touch gesture), the virtualized document explorer may change folder view to display the files as large, medium, or small icons, as a list, with details, and so forth.

Figure 6C:
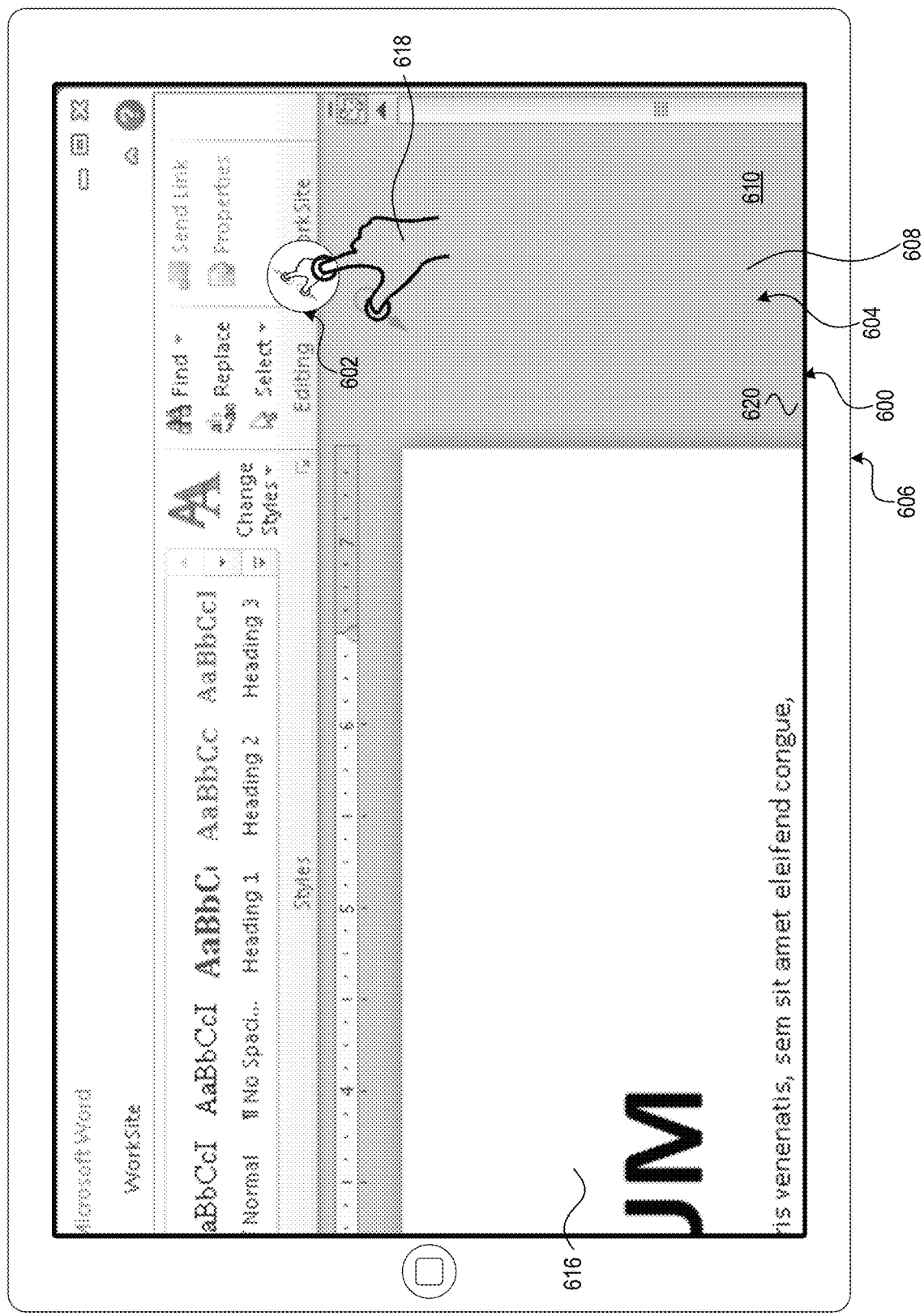
FIG. 6C depicts the interface of FIG. 6A updated in response to a localized zoom gesture received at the touchscreen.

Referring now to FIG. 6C, the native display 604 of FIG. 6A is shown updated in response to receipt of a zoom gesture received at the interface 600 and interpreted locally. As seen in FIG. 6C, a pinch open touch gesture 618 is performed with focus on the hotspot 602, in other words when a portion of the pinch open touch gesture occurs at the hotspot and another portion of the pinch open touch gesture does not occur at the hotspot. Because the hotspot 602 has focus when the interface 600 receives the pinch open touch gesture 618, the client agent determines that the touch gesture should be interpreted locally. In this example, the client agent zooms in at the native display 604 (e.g., from 100% to 200%) such that the native display presents a portion of the virtual display 608 in response to receipt of the pinch open touch gesture 618 while the hotspot 602 has focus. It will be appreciated that the client agent may zoom out (e.g., from 200% to 100%) in response to receipt of a pinch close touch gesture received at the interface 600 while the hotspot 602 has focus. It will again be recognized that the pinch open touch gesture 618 of FIG. 6C is interpreted locally causing changes only to the native display 604, e.g., to zoom in at the native display; because the pinch open touch gesture 618 was not remoted to the virtualized application 610, the visual output of the virtual display 608 has not changed in FIG. 6C. The pinch open touch gesture described with reference to FIG. 6C thus represents a circumstance in which the touch gesture is performed with focus on the hotspot 602 and is interpreted locally as a result.

In some example implementations, the interface 600 may include a highlighted border 620 to indicate to the user that the interface is zoomed in. The highlighted border 620 may be colored (e.g., green) in some example implementations. Additionally, the interface 600 may include the highlighted border 620 whenever the zoom level of the native display 604 is anything other than 100%.

In some example implementations, the client agent may be configured to zoom in or zoom out at the native display 604 in response to receipt of a double-tap touch gesture received at the hotspot 602. In this example, the client agent may zoom in when the double-tap touch gesture is received while the zoom level of the native display is 100% and may zoom out when the double-tap touch gesture is received while the zoom level is greater than 100%. Additionally, the client agent may zoom the native display 604 to the portion of the virtual display 608 that corresponds to the location of the hotspot 602 at the interface 600. The double-tap touch gesture at the hotspot 602 to zoom in or out at the native display 604 thus represents a circumstance in which the touch gesture entirely occurs at the interface control element and is interpreted locally as a result.

Figure 6D:
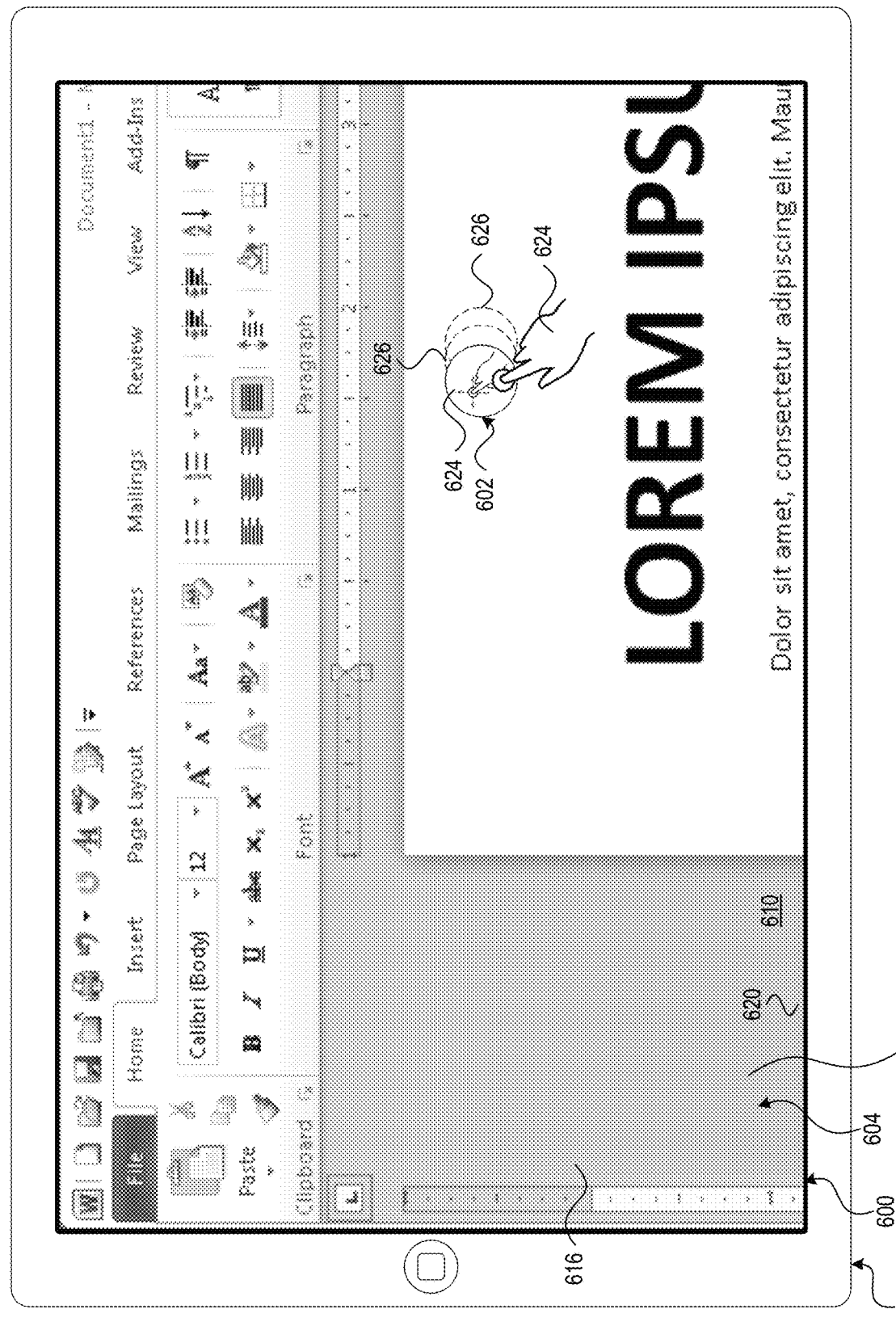
FIG. 6D depicts the interface of FIG. 6C updated in response to a localized pan touch gesture received at the touchscreen.

As also noted above, a user may pan the native display 604 when the zoom level of the native display is greater than 100%. In this example, the user may also utilize the hotspot 602 to pan the native display 604. In FIG. 6D, the native display 604 of FIG. 6C is shown updated in response to receipt of a pan touch gesture received at the interface 600 and interpreted locally for the native display 604. When the native display 604 is zoomed in, the native display may present only a portion of the virtual display 608. Accordingly, a user may pan the native display 604 to view other portions of the virtual display 608. When the native display 604 is zoomed in, the hotspot 602 may be updated to display a new icon 622 that indicates the hotspot may receive a pan touch gesture 624 to pan the native display 604. The user may pan the native display 604 by dragging the hotspot 602 in an upward, downward, leftward, or rightward direction. In response, the native display 604 may be adjusted in the direction of the pan touch gesture. Moreover, an interface control element such as the hotspot 602 may adjust its transparency level depending on whether the hotspot is currently receiving a touch gesture. When an interface control element receives a touch gesture, the interface control element may become relatively more transparent, and when the touch gesture is complete, the interface control element may remove any transparency.

As shown by way of example in FIG. 6D, the pan touch gesture 624 drags the hotspot 602 to the left as indicated by the dashed outlines 626 of the hotspot. In response to receipt of the leftward pan touch gesture 624, the client agent pans the native display 604 to the left in order to present a left-side portion of the virtual display 608 at the interface 600. Additional pan touch gestures may be provided at the hotspot 602 in order to pan to other portions of the virtual display 608. In some example implementations, the hotspot 602 may be fixed at its location when the native display 604 is zoomed in. In this example, the hotspot may be an "anchor point" when the zoom level of the native display is greater than 100%. The hotspot, in this example, may still respond to a pan touch gesture when fixed, but the user may not be able to drag the hotspot around the interface 600 in contrast to the moveable hotspot 602 shown by way of example in FIG. 6D. It will be recognized that the pan touch gesture 624 of FIG. 6D is interpreted locally causing changes only to the native display 604, e.g., to pan the native display; because the pan touch gesture 624 was not remoted to the virtualized application 610, the visual output of the virtual display 608 has not changed in FIG. 6D. The pan touch gesture received at the hotspot 602 to pan the native display 604 thus represents another circumstance in which the touch gesture entirely occurs at the interface control element and is interpreted locally as a result.

The user may interact with the virtualized application 610 as normal when the native display 604 is zoomed in. The client agent may remote touch gestures to the virtualization server whenever the touch gestures are received without focus on the hotspot 602. Additionally, the hotspot 602 may be fixed at a particular location the interface 600, or the user may move the hotspot to a desired location by dragging the hotspot to a new location when the zoom level of the interface is 100%. Furthermore, the hotspot 602 may be configured to respond to double-tap touch gestures. If the hotspot 602 receives a double-tap touch gesture when the zoom level of the interface is 100%, then the client agent may zoom the interface to, e.g., 200%. Similarly, if the hotspot 602 receives a double-tap touch gesture when the zoom level of the interface 600 is 200%, then the client agent may zoom the interface back to, e.g., 100%. In some example implementations, users may be able to customize the behavior of the hotspot 602 by adjusting one or more configuration settings, e.g., a preferred zoom level associated with a double-tap touch gesture, a preferred panning speed, whether the hotspot is fixed or moveable, and so forth.

Virtual Mouse Interface Control

A second type of interface control may be referred to as a virtual mouse. As noted above, the GUI elements at the virtual display may be too small for a user to accurately select via touch gesture. The virtual mouse may thus improve the accuracy of touch gestures by providing a relatively larger target area to receive the touch gesture along with a component to precisely select a desired GUI element. The virtual mouse may also providing zooming and panning functionality as described above with reference to the hotspot.

In FIG. 7A, an example of an interface 700 having a virtual mouse interface control 702 is shown. As noted above, the interface 700 comprises the native display 704 of the computing device 706 as well as the virtual display 708 of the virtualized application 710. As seen in FIG. 7A, the virtualized application 710 may include a toolbar 712 with various command icons 714 and command menus 716 that may be too small for a user to accurately select using touch gestures. The virtual mouse 702 thus improves the accuracy of selecting the command icons 714 and/or command menus 716 via touch gestures. It will also be appreciated that the virtual mouse 702 may also improve the accuracy of selecting other relatively small GUI elements, e.g., highlighting text presented at the virtual display 708.

The virtual mouse 702 shown by way of example in FIG. 7A includes three target areas: a left-click target area 718, a right-click target area 720, and a zoom target area 722. The virtual mouse 702 also includes a pointer 724 for precisely selecting GUI elements at the virtual display 708, e.g., the command icons 714 and/or command menus 716. A user may drag the virtual mouse around the native display 704 in order to position the pointer 724 over desired interface elements of the virtual display 708. Some touch gestures received at the virtual mouse 702 may be interpreted locally while other touch gestures received at the virtual mouse may be remoted to a virtualization server and interpreted remotely for a virtualized application. Whether a touch gestures is locally or remotely interpreted may depend on where the virtual mouse 702 receives the touch gesture. In this example, the client agent may remote to a virtualization server touch gestures received at the left-click target area 718 and the right-click target area 720. The left-click target area 718 and the right-click target area 720 may respectively invoke left-click and right-click functionality when remoted to the virtualized application 710. For example, the client agent may transmit mouse events to the virtualization server in response to tap touch gestures received at the left-click target area 718 and the right-click target area 720. Accordingly, the touch gesture information transmitted to the virtualization server may correspond to a left-click or a right-click of a physical pointing device, e.g., a mouse. The touch gestures received at the target areas 718-722 thus represent circumstances in which a touch gesture is interpreted locally or remoted to a virtualization server depending on which target area received the touch gesture.

Providing a tap touch gesture at the left-click target area 718 may perform a selection or place a cursor at the virtualized application 710, and a tap touch gesture at the right-click target area 720 may display a context menu at the virtualized application. The pointer 724 of the virtual mouse 702 may provide the touchscreen coordinates to associate with the touch gestures received at the virtual mouse. Because the pointer 724 of the virtual mouse 702 provides more precise selection capabilities, a user may more accurately interact with the various GUI elements of the virtualized application 710. The larger target areas 718 and 720 coupled with the precise selection ability of the pointer 724 thus reduces the improves the ability to invoke desired functionality at the virtualized application 710. The user may also move the virtual mouse 702 around the interface 700 as needed to interact with the virtualized application, e.g., using a scroll touch gesture received at the interface while the virtual mouse 702 has focus.

Providing a touch gesture at the zoom target area 722 of the virtual mouse, however, may cause the touch gesture to be interpreted locally for the native display 704. As an example, the zoom target area 722 may zoom the native display 704 in response to receipt of, e.g., a double-tap touch gesture. The zoom target area 722 may include an icon indicating the zooming capabilities of the virtual mouse 702 as shown by way of example in FIG. 7A. In some example implementations, the zoom target area 722 may also be configured to remote certain touch gestures to the virtualization server. As an example, the client agent 510 may be configured to transmit mouse events to the virtualization server in response to receipt of a upward swipe touch gesture or a downward swipe touch gesture received at the zoomed target area 722. In this example, the zoom target area 722 may be associated with a UISwipeGestureRecognizer to identify upward and downward swipe touch gestures. The tap touch gesture and swipe touch gestures thus represent circumstances in which a touch gesture is interpreted locally or remoted to a virtualization server depending on the type of touch gesture received at a target area of an interface control element.

Figure 7B:
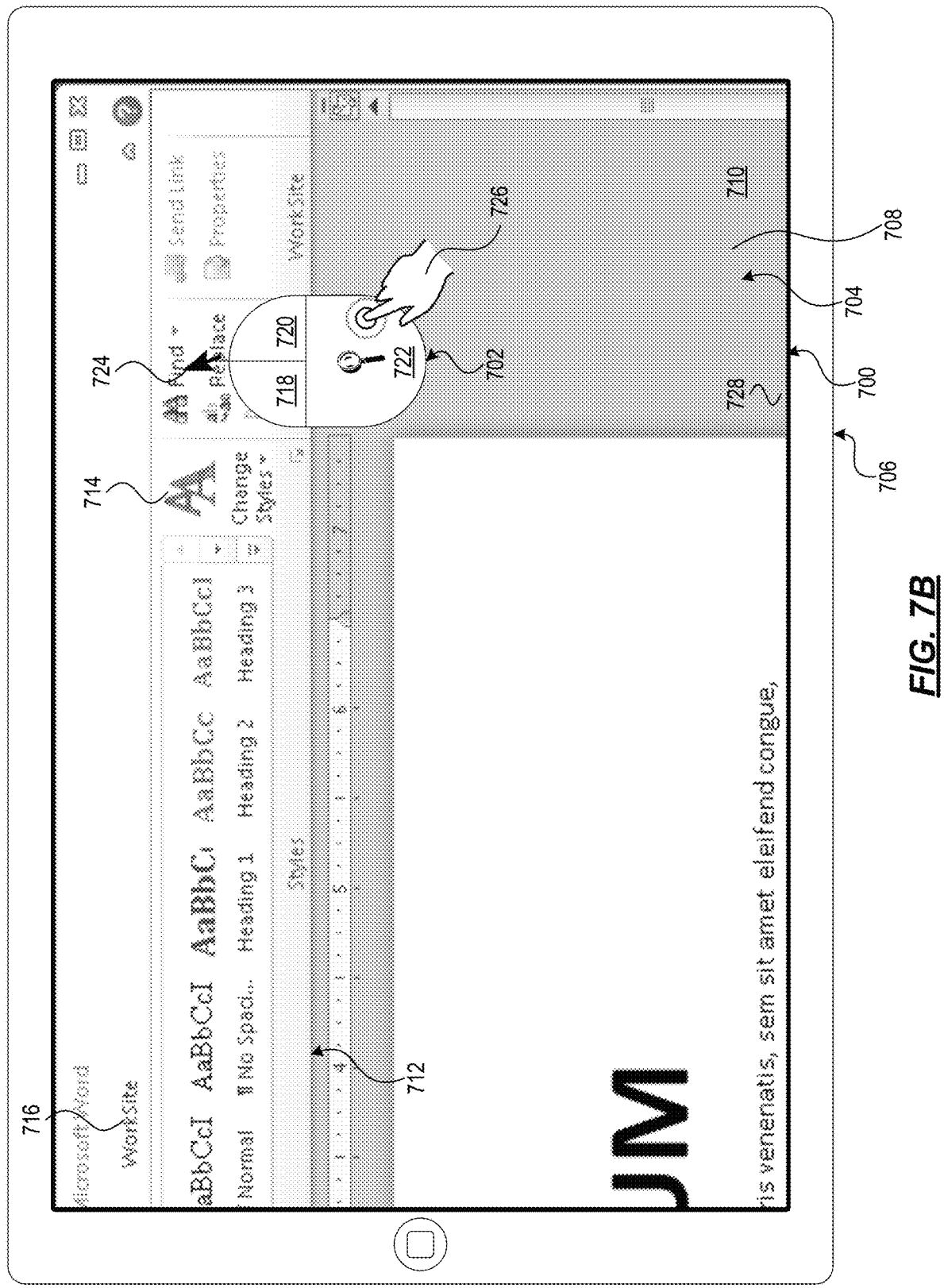
FIG. 7B depicts the interface of FIG. 7A updated in response to a localized zoom gesture received at the touchscreen.

FIG. 7B depicts the interface 700 of FIG. 7A updated in response to receipt of a zoom gesture received at the native display 704 and interpreted locally. As seen in FIG. 7B, a double-tap touch gesture 726 is performed at the zoom target area 722 of the virtual mouse 702. In response to receipt of the double-tap touch gesture 726 at the zoom target area 722, the client agent, in this example, may interpret the touch gesture locally for the native display 704. In this example, the client agent zooms in at the native display 704 (e.g., from 100% to 200%) such that the native display presents only a portion of the virtual display 708 in response to receipt of the double-tap touch gesture 726 received at the zoom target area 722 of the virtual mouse 702. It will be appreciated that the client agent may zoom out (e.g., from 200% to 100%) in response to receipt of a subsequent double-tap touch gesture performed at the zoom target area 722 of the virtual mouse 702. As mentioned above, the interface 700 may include a highlighted border 728 to indicate to the user that the native display 704 is zoomed in. Having zoomed the native display 704, the GUI elements 714 and 716 may be relatively larger. As a result, a user may more easily read text presented at the virtual display 708 and more accurately select GUI elements via touch gestures remoted to the virtualized application 710. In addition, the user may continue to utilize the virtual mouse 702 to provide input to the virtualized application 710 even when the native display 704 is zoomed in.

Figure 7C:
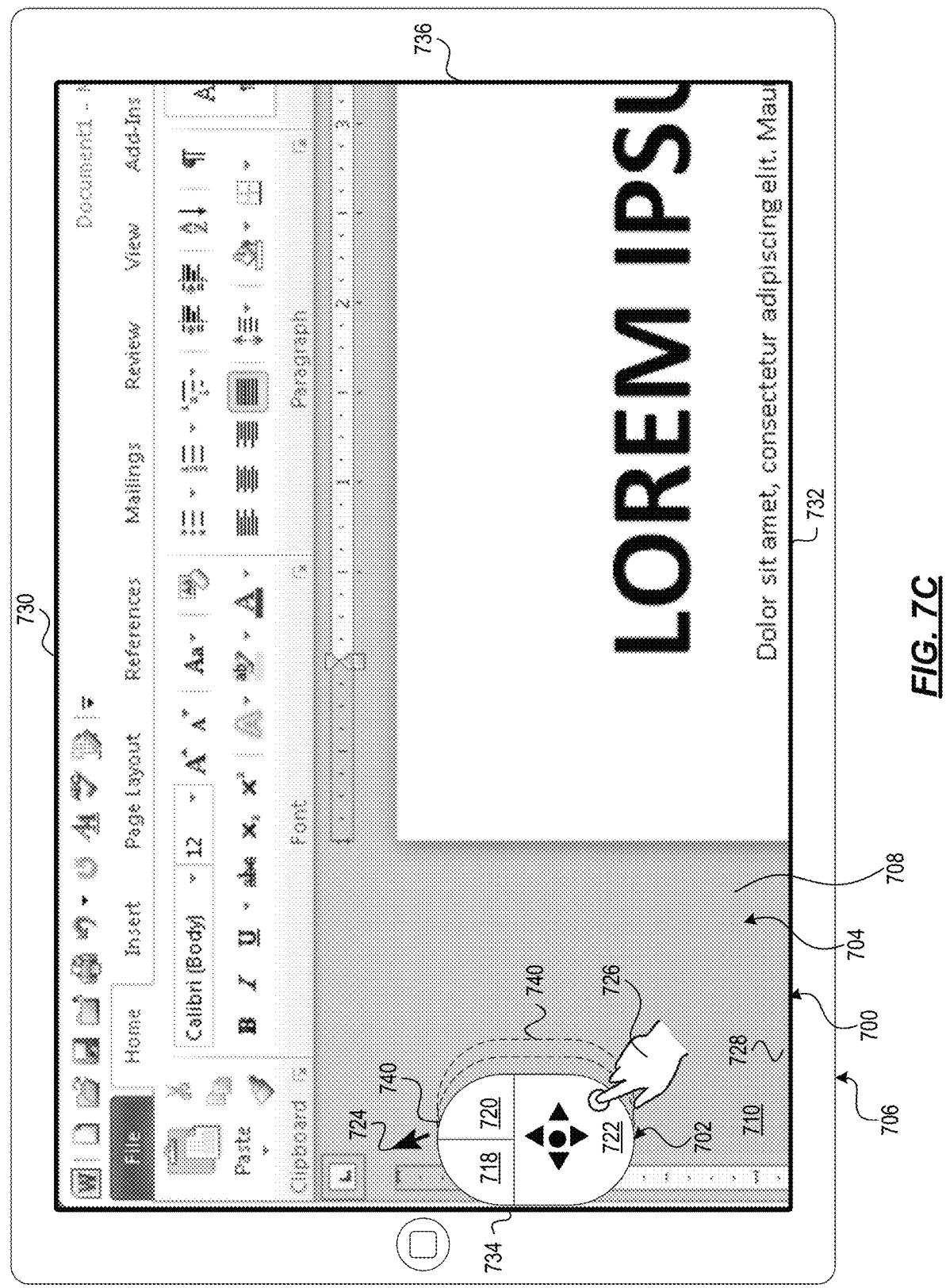
FIG. 7C depicts the interface of FIG. 7B updated in response to a localized pan touch gesture received at the touchscreen.

As mentioned above, a user may utilize the virtual mouse 702 to pan the native display 704 when zoomed in. In this regard, pan touch gestures received at the virtual mouse 702 may be interpreted locally for the native display 704 of the interface 700. In FIG. 7C, the native display 704 of FIG. 7B is shown updated in response to receipt of a pan touch gesture received at the interface 700 and interpreted locally for the native display 704. When zoomed in, the native display 704 may present only a portion of the virtual display 708. Accordingly, a user may pan the native display 704 to view other portions on the virtual display 708. When native display 704 is zoomed in, the virtual mouse 702 may be updated to display a new icon that indicates the virtual mouse may receive a pan touch gesture to pan the native display. The user may pan the native display 804 by dragging the virtual mouse 702 in an upward, downward, leftward, or rightward direction. In some example implementations, the native display 704 may pan when the user drags the virtual mouse 702 to be positioned proximate to one of the edges of the interface 700. For example, the native display 704 may pan upward when the user positions the virtual mouse 702 next to the top edge 730 of the interface, may pan downward when the user positions the virtual mouse next to the bottom edge 732 of the interface, may pan leftward when the user positions the virtual mouse next to the left edge 734 of the interface, and may pan rightward when the user positions the virtual mouse next to the right edge 736 of the interface. Additionally, the user may pan the native display 704 upward and rightward by positioning the virtual mouse 702 next to the top edge 730 and the right edge 736, e.g., near the top-right corner of the interface 700. The user may pan the native display 704 upward and leftward, downward and leftward, and downward and rightward by respectively positioning the virtual mouse 702 near the corresponding edges of the interface 700.

As shown by way of example in FIG. 7C, a pan touch gesture 738 is performed at the virtual mouse 702 that drags the virtual mouse leftward as indicated by the dashed outlines 740 of the virtual mouse. With this example pan touch gesture 738, the user has positioned the virtual mouse 702 next to the left edge 734 of the interface 700 which pans the native display 704 leftward in response. The leftward pan touch gesture 738 in FIG. 7C thus causes the native display 704 to present a left-side portion of the virtual display 708. Additional pan touch gestures may be performed at the virtual mouse 702 to pan to other portions of the virtual display 708.

As with the hotspot described above, the user may interact with the virtualized application 710 as normal when the native display 704 is zoomed in. The client agent may remote touch gestures that are not performed at the virtual mouse 702 to a virtualization server. Additionally, users may be able to customize the behavior of the virtual mouse 702 by adjusting one or more configuration settings, e.g., a preferred zoom level associated with a double-tap touch gesture, a preferred panning speed, and so forth.

Virtual Joystick Interface Control

Figure 8A:
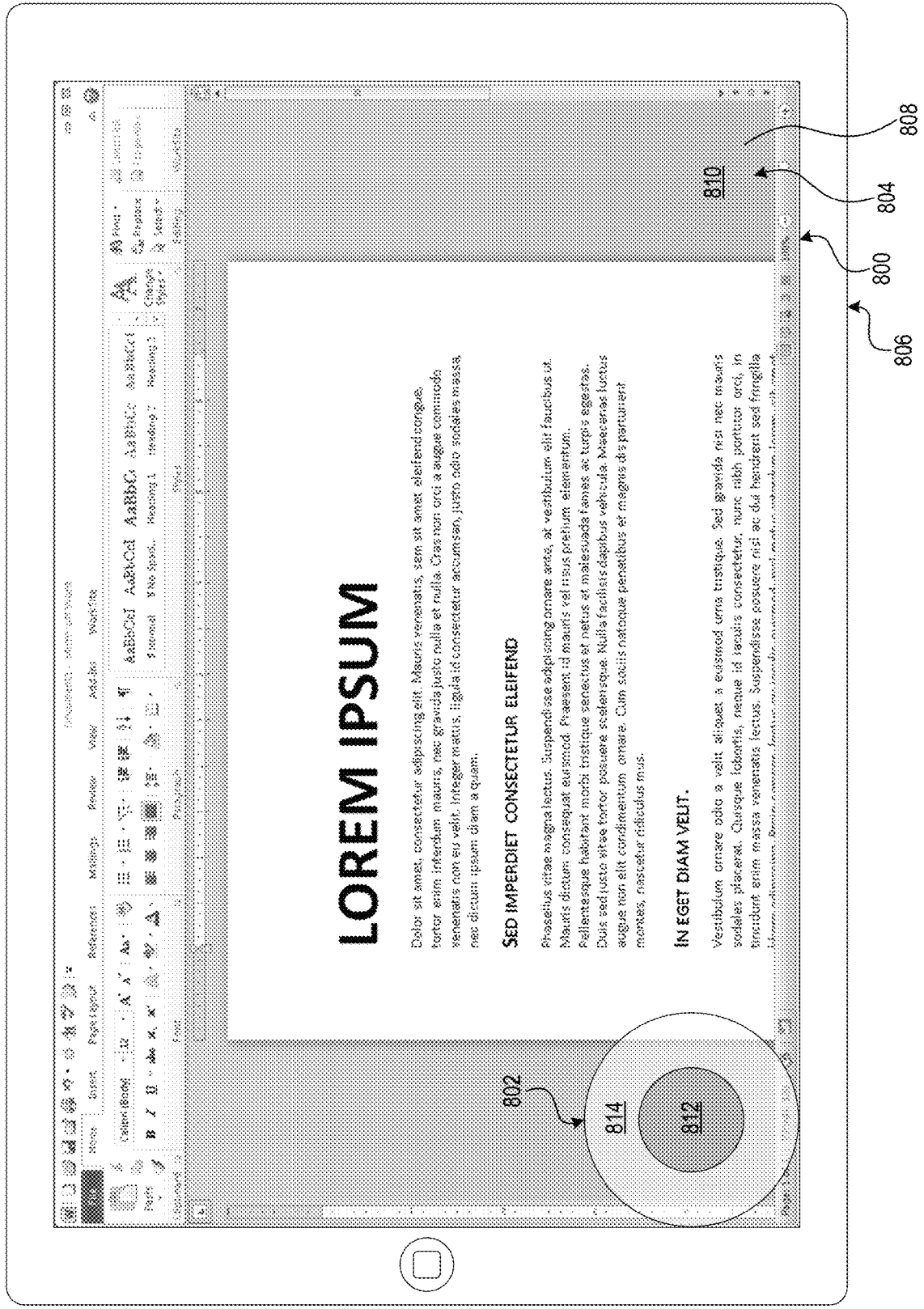
FIG. 8A depicts an example of an interface with a third type of interface control that may be used in accordance with aspects of the present invention.

A third type of interface control may be referred to as a virtual joystick that mimics the operation of a physical joystick. The virtual joystick may also provide zooming and panning functionality as described above with reference to the hotspot and virtual mouse. In FIG. 8A, an example of an interface 800 having a virtual joystick 802 is shown. The interface 800 may likewise comprise the native display 804 of the computing device 806 as well as the virtual display 808 of a virtualized application 810.

The virtual joystick 802, in this example, comprises a moveable control element 812 concentric with a stationary surrounding element 814. As shown by way of example in FIG. 8A, the moveable control element 812 is an inner circle, and the surrounding element 814 is an outer circle that surrounds the inner circle. The user may zoom in at the native display 804 by performing touch gestures at the virtual joystick 802 as described in further detail below. In addition, the user may pan the native display 804 by moving the inner circle 812 within the outer circle 814 as also described in further detail below. Touch gestures performed at the virtual joystick 802 may be interpreted locally to zoom and pan the native display 804 of the interface 800.

Figure 8B:
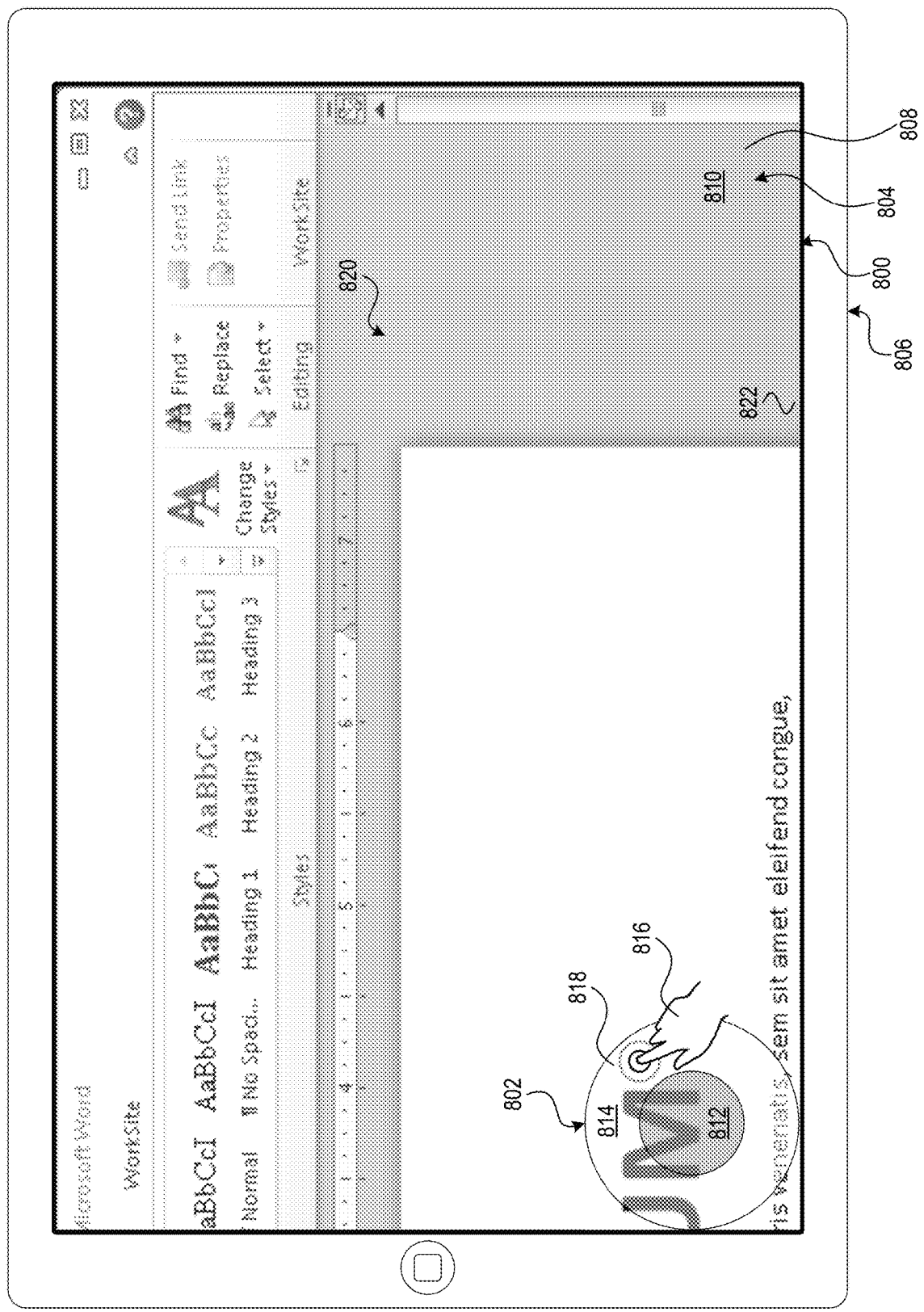
FIG. 8B depicts the interface of FIG. 8A updated in response to a localized zoom gesture received at the touchscreen.

FIG. 8B depicts the native display 804 of FIG. 8A updated in response to a zoom gesture received at the interface 800 and interpreted locally. As seen in FIG. 8B, a double-tap touch gesture 816 is performed at the virtual joystick 802. In response to receipt of the double-tap touch gesture 816, the client agent, in this example, may interpret the touch gesture locally for the native display 804. In this example, the client agent zooms in at the native display 804 (e.g., from 100% to 200%) such that the native display presents only a portion of the virtual display 808 in response to receipt of the double-tap touch gesture 816 at the virtual joystick 802. It will be appreciated that the client agent may zoom out at the native display 804 (e.g., from 200% to 100%) in response to receipt of a subsequent double-tap touch gesture performed at the virtual joystick 802. The interface 800 may likewise include a highlighted border 822 when the native display 804 is zoomed in.

Moreover, the client agent may be configured to zoom the native display 804 to a different portion of the virtual display 808 depending on where the user performs a double-tap touch gesture on the virtual joystick 802. As shown by way of example in FIG. 8B, the double-tap touch gesture 816 is performed in the upper-right region 818 of the outer circle 814 at the virtual joystick 802. In response, the client agent zooms native display 804 to the upper-right region 820 of the virtual display 808. It will be appreciated that the client agent may zoom the native display 804 to the upper-left region, the lower-left region, or the lower-right region of the virtual display 808 in response to double-tap touch gestures respectively performed at the upper-left region, the lower-left region, and the lower-right region of the virtual joystick 802. It will also be appreciated that the virtual joystick 802 may include additional or alternative regions to receive double-tap touch gestures. In some example implementations, the client agent may map the coordinates of a double-tap touch gesture performed at the virtual joystick 802 to corresponding coordinates of the virtual display 808 in order to determine the portion of the virtual display 808 to zoom to. The double-tap touch gesture performed at the virtual joystick 802 thus represents a circumstance in which a touch gesture entirely received at an interface control element is interpreted locally based on the type of interface control element.

Figure 8C:
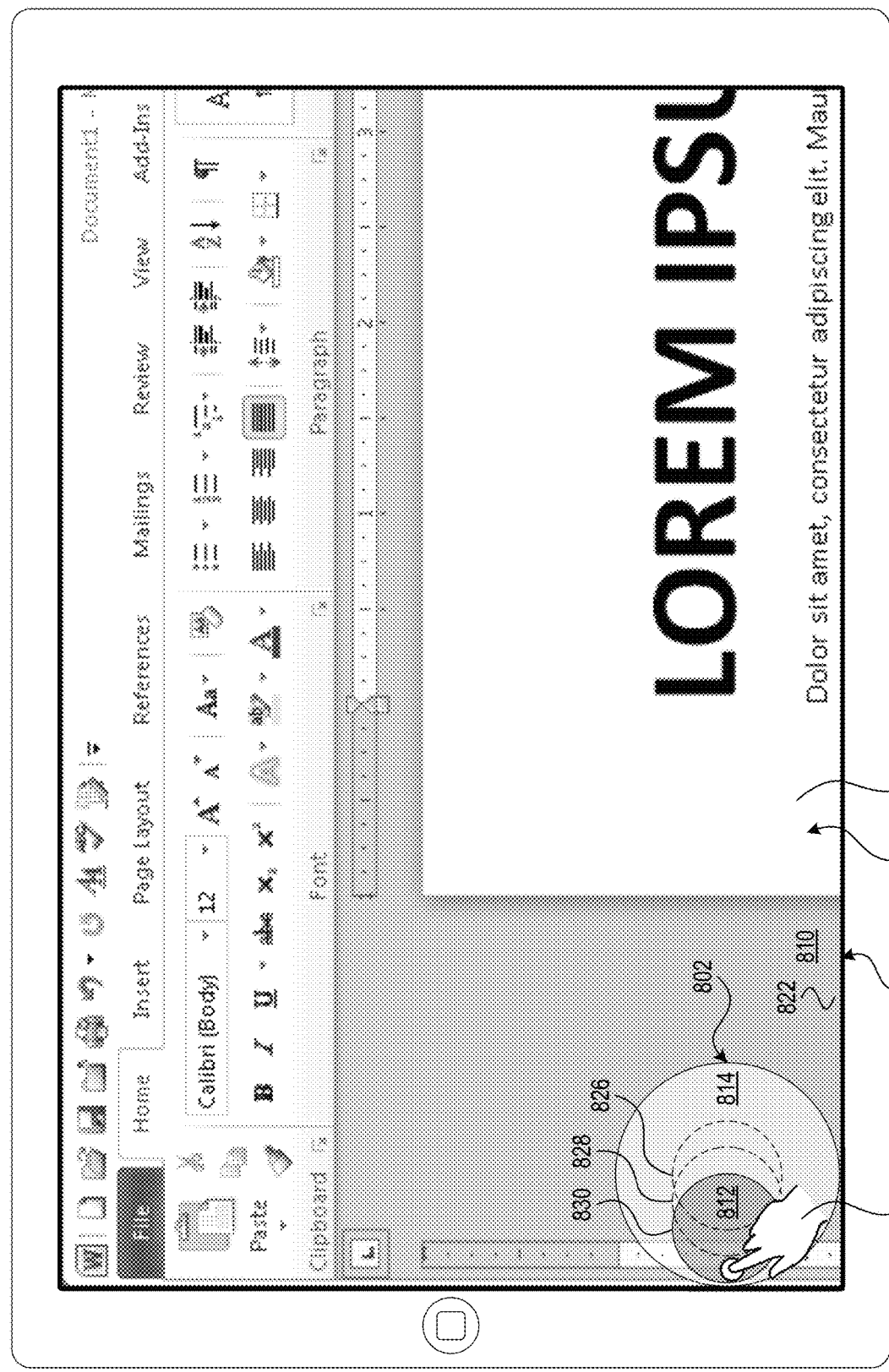
FIG. 8C depicts the interface of FIG. 8B updated in response to a localized pan touch gesture received at the touchscreen.

As indicated above, a user may utilize the virtual joystick 802 to pan the native display 804 when zoomed in. In this regard, pan touch gestures received at the virtual joystick 802 may be interpreted locally for the native display 804 of the interface 800. In FIG. 8C, the native display 804 of FIG. 8B is shown updated in response to receipt of a pan touch gesture received at the interface 800 and interpreted locally. When the native display 804 is zoomed in, the native display may present only a portion of the virtual display 808 as described above.

Accordingly, a user may pan the native display 804 to view other portions of the virtual display 808. When the interface 800 is zoomed in, the user may pan the native display 804 by dragging the inner circle 812 within the outer circle 814 of the virtual joystick 802. For example, the user may pan the native display 804 upward by dragging the inner circle 812 upward within the outer circle 814, may pan the native display downward by dragging the inner circle downward within the outer circle of the virtual joystick 802, may pan the native display leftward by dragging the inner circle leftward within the outer circle, and may pan the native display rightward by dragging the inner circle rightward within the outer circle. In addition, the user may simultaneously pan the native display 804 upward and rightward by dragging the inner circle 812 upward and rightward within the outer circle 814 of the virtual joystick 802. The user may likewise pan the native display 804 upward and leftward, downward and leftward, and downward and rightward by respectively dragging the inner circle 812 in corresponding directions within the outer circle 814 of the virtual joystick 802.

As shown by way of example in FIG. 8C, dashed outlines 826 and 828 illustrate a pan touch gesture 824 performed at the virtual joystick 802, which drags the inner circle 812 leftward within the outer circle 814. With this example pan touch gesture 824, the client agent pans the native display 804 to present a left-side portion of the virtual display 808. Additional pan touch gestures may be performed at the virtual joystick 802 to pan to other portions of the virtual display 808.

Moreover, the panning speed may depend on the distance between the inner circle 812 and the center of the outer circle 814 of the virtual joystick 802. For example, when the inner circle 812 is concentric with the outer circle, the native display 804 may be stationary, i.e., the panning speed may be zero. As described above, the native display 804 may pan as the user drags the inner circle 812 away from the center of the outer circle 814 of the virtual joystick, i.e., the panning speed may be greater than zero. The panning speed may increase as the user drags the inner circle 812 farther away from the center of the outer circle 814 of the virtual joystick 802, e.g., at position 828, the panning speed may be 1.0, and at position 830, the panning speed may be 1.5. The pan touch gesture performed at the virtual joystick 802 thus represents another circumstance in which a touch gesture entirely received at an interface control element is interpreted locally based on the type of interface control element.

As with the hotspot and virtual mouse described above, the user may interact with the virtualized application 810 as normal when the interface 800 is zoomed in. The client agent may remote to a virtualization server touch gestures that are not performed at the virtual joystick 802. Additionally, users may be able to customize the behavior of the virtual joystick 802 by adjusting one or more configuration settings, e.g., minimum and maximum pan speeds, a preferred zoom level associated with a double-tap touch gesture, and so forth.

Virtual Preview Pane Interface Control

Figure 9A:
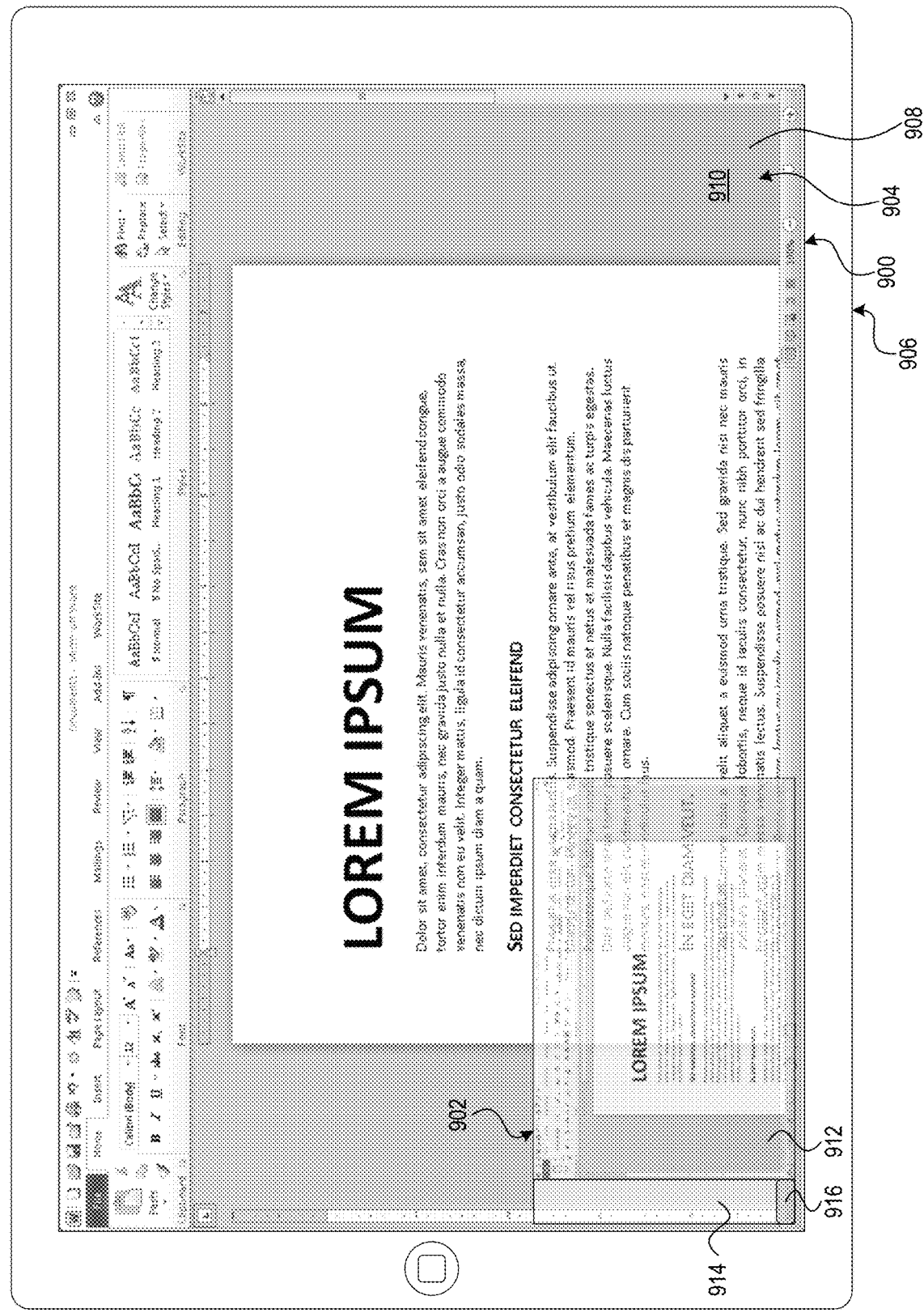
FIG. 9A depicts an example of an interface with a fourth type of interface control that may be used in accordance with aspects of the present invention.

A fourth type of interface control may be referred to as a preview pane. The preview pane may provide zooming and panning functionality as described above with reference to the hotspot, virtual mouse, and virtual joystick. In FIG. 9A, an example of an interface 900 having a preview pane 902 is shown. The interface 900 may similarly comprise the native display 904 of the computing device 906 as well as the virtual display 908 of a virtualized application 910.

The preview pane 902, in this example, comprises a real-time miniature display 912 of the entire virtual display 908 of the virtualized application 910. The preview pane 902 therefore allows a user to easily locate a point of interest at the virtual display 908, in particular, when the native display 904 is zoomed in. As an example, the preview pane 902 may be useful to locate a dialog box that appears at the virtual display 908 but outside of the present view of the zoomed native display 904. The preview pane 902, in this example, also comprises a zoom bar 914 and a slider 916 that adjusts the zoom level of the interface 900. For example, a user may perform a scroll touch gesture at the slider 916 of the zoom bar 914 to zoom in and zoom out at the native display 904. The position of the slider 916 of the zoom bar 914 may correspond to the current zoom level of the native display 904. As shown by way of example, the zoom level of the interface 900 in FIG. 9A may be 100%, and the slider 916 may thus be positioned at the bottom of the zoom bar 914. The user may zoom in at the native display 904 by performing a scroll touch gesture to drag the slider 916 upward along the zoom bar 914. The zoom level of the interface 900 may be at maximum when the slider 916 is positioned at the top of the zoom bar 914. It will be appreciated that a user may zoom out at the native display 904 by performing a scroll touch gesture to drag the slider 916 downward along the zoom bar 914. Additional and alternative configurations and behaviors may be selectively employed for the zoom bar 914 and slider 916.

The user may also zoom in and zoom out at the interface 900 by performing touch gestures at the preview pane 902 as described in further detail below. In addition, the user may pan the native display by performing touch gestures at the preview pane 902 as also described in further detail below. Touch gestures performed at the preview pane 902 may be interpreted locally to zoom and pan the native display 904 of the interface 900.

Figure 9B:
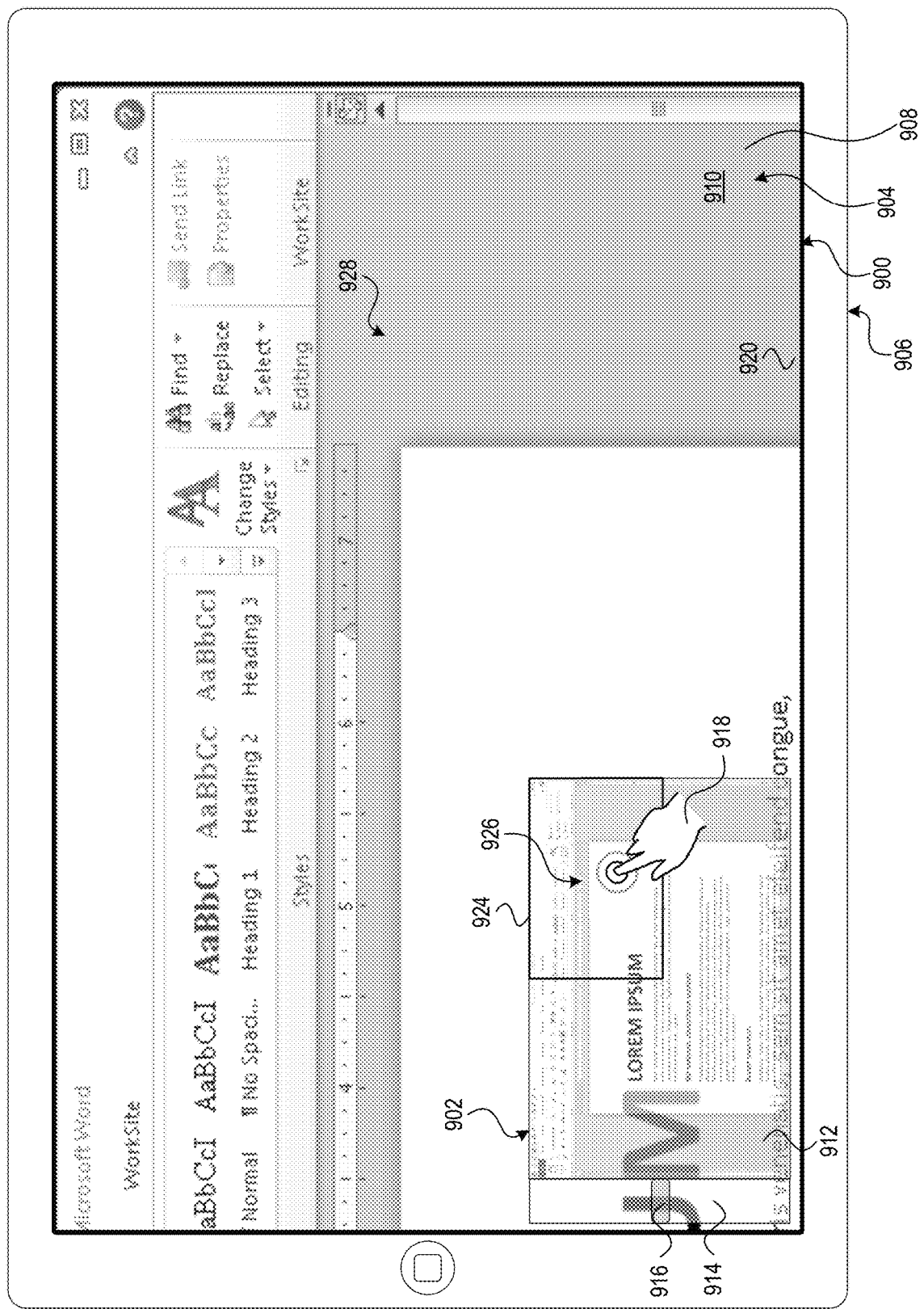
FIG. 9B depicts the interface of FIG. 9A updated in response to a localized zoom gesture received at the touchscreen.

FIG. 9B depicts the native display 904 of FIG. 9A updated in response to a zoom gesture received at the interface 900 and interpreted locally. As seen in FIG. 9B, a double-tap touch gesture 918 is performed at the preview pane 902. In response to receipt of the double-tap touch gesture 918, the client agent, in this example, may interpret the touch gesture locally for the native display 904. In this example, the native display 904 zooms in (e.g., from 100% to 200%) such that the native display presents only a portion of the virtual display 908 in response to receipt of the double-tap touch gesture 918 at the preview pane 902. It will be appreciated that the client agent may zoom out (e.g., from 200% to 100%) in response to receipt of a subsequent double-tap touch gesture performed at the preview pane 902. The double-tap touch gesture performed at the preview pane 902 thus represents an additional circumstance in which a touch gesture entirely received at an interface control element is interpreted locally based on the type of interface control element. The interface 900 may likewise include a highlighted border 920 when the interface is zoomed in. Additionally, the slider 916 of the zoom bar 914, in this example, is positioned near the middle of the zoom bar indicating that the zoom level of the native display 904 is about halfway between 100% and a maximum zoom level.

As also shown by way of example in FIG. 9B, the preview pane 902 may include a focus window 924 that corresponds to the portion of the virtual display 908 currently presented at the native display 904. A user may perform a pan touch gesture to drag the focus window 924 within the miniature display 912 to view other portions of the virtual display 908. Additionally, the focus window 924 may comprise a colored border (e.g., green) to provide contrast between the miniature display 912 and the focus window 924.

Similar to the virtual joystick described above, the client agent may be configured to zoom to a different portion of the virtual display 908 depending on where the user performs the double-tap touch gesture on the preview pane 902. As shown by way of example in FIG. 9B, the double tap touch gesture 918 is performed in the upper-right region 926 of the preview pane 902. In response, the client agent zooms the native display 904 to the upper-right region 928 of the virtual display 908. It will be appreciated that the client agent may zoom the native display 904 to the upper-left region, the lower-left region, or the lower-right region of the virtual display 908 in response to double-tap touch gestures respectively performed at the upper-left region, the lower-left region, and the lower-right region of the preview pane 902. It will also be appreciated that the preview pane 902 may include additional or alternative regions to receive double-tap touch gestures. In some example implementations, the client agent may map the coordinates of a double-tap touch gesture performed at the preview pane 902 to corresponding coordinates of the virtual display 908 in order to determine the portion of the virtual display 908 to zoom to.

Figure 9C:
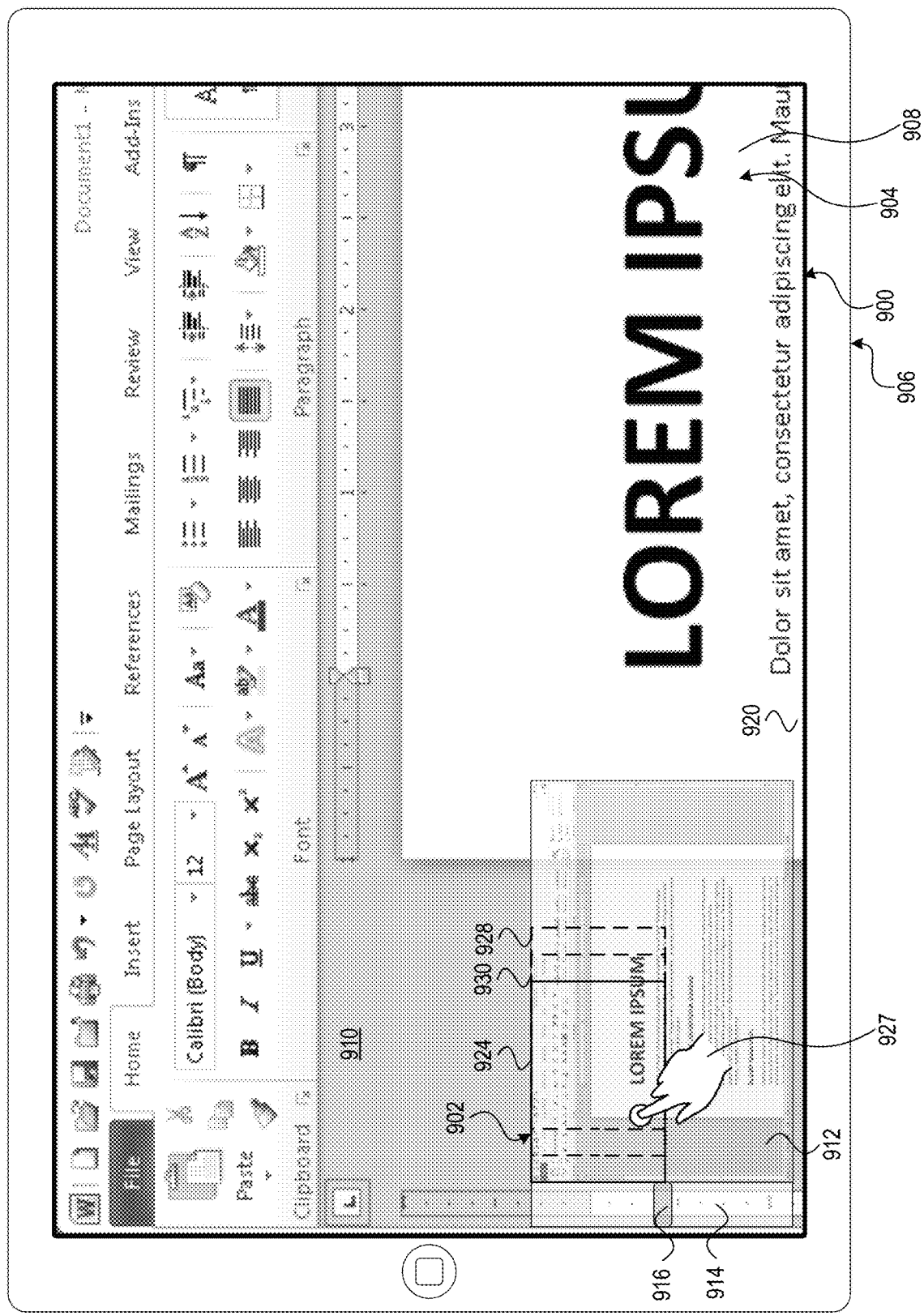
FIG. 9C depicts the interface of FIG. 9B updated in response to a localized pan touch gesture received at the touchscreen.

As indicated above, a user may utilize the focus window 924 of the preview pane 902 to pan the native display 904 when the interface 900 is zoomed in. In this regard, pan touch gestures received at the preview pane 902 to drag the focus window 924 may be interpreted locally for the native display 904 of the interface 900. In FIG. 9C, the native display 904 of FIG. 9B is shown updated in response to receipt of a pan touch gesture received at the interface 900 and interpreted locally. When the native display 904 is zoomed in, the native display may present only a portion of the virtual display 908.

Accordingly, a user may pan the native display 904 to view other portions of the virtual display 908. When the native display 904 is zoomed in, the user may pan the native display by performing a pan touch gesture to drag the focus window 924 within the miniature display 912 of the preview pane 902. For example, the user may pan the native display 904 upward by dragging the focus window 924 upward within the miniature display 912, may pan the native display downward by dragging the focus window downward within the miniature display, may pan the native display leftward by dragging the focus window leftward within the miniature display, and pan the native display rightward by dragging the focus window rightward within the preview pane. In addition, the user may simultaneously pan the native display 904 upward and rightward by dragging the focus window upward and rightward within the miniature display 912 of the preview pane. The user may likewise pan the native display 904 upward and leftward, downward and leftward, and downward and rightward by respectively dragging the focus window 924 in corresponding directions within the miniature display 912 of the preview pane 902.

As shown by way of example in FIG. 9C, dashed outlines 928 and 930 illustrate a pan touch gesture 927 is performed at the preview pane 902 that drags the focus window 924 leftward within the miniature display 912. With this example pan touch gesture 927, the client agent pans the native display 904 to present a left-side portion of the virtual display 908. Additional pan touch gestures may be performed at the preview pane 902 to pan to other portions of the virtual display 908. The double-tap touch gesture performed at the preview pane 902 thus represents a further circumstance in which a touch gesture entirely received at an interface control element is interpreted locally based on the type of interface control element.

As with the hotspot, virtual mouse, and virtual joystick described above, the user may interact with the virtualized application 910 as normal when the native display 904 is zoomed in. The client agent may remote to a virtualization server touch gestures that are not performed at the preview pane 902. Additionally, users may be able to customize the behavior of the preview pane 902 by adjusting one or more configuration settings, e.g., a preferred zoom level associated with a double-tap touch gesture, a preferred panning speed, and so forth.

Remoting or Localizing Touch Gestures

Figure 10:
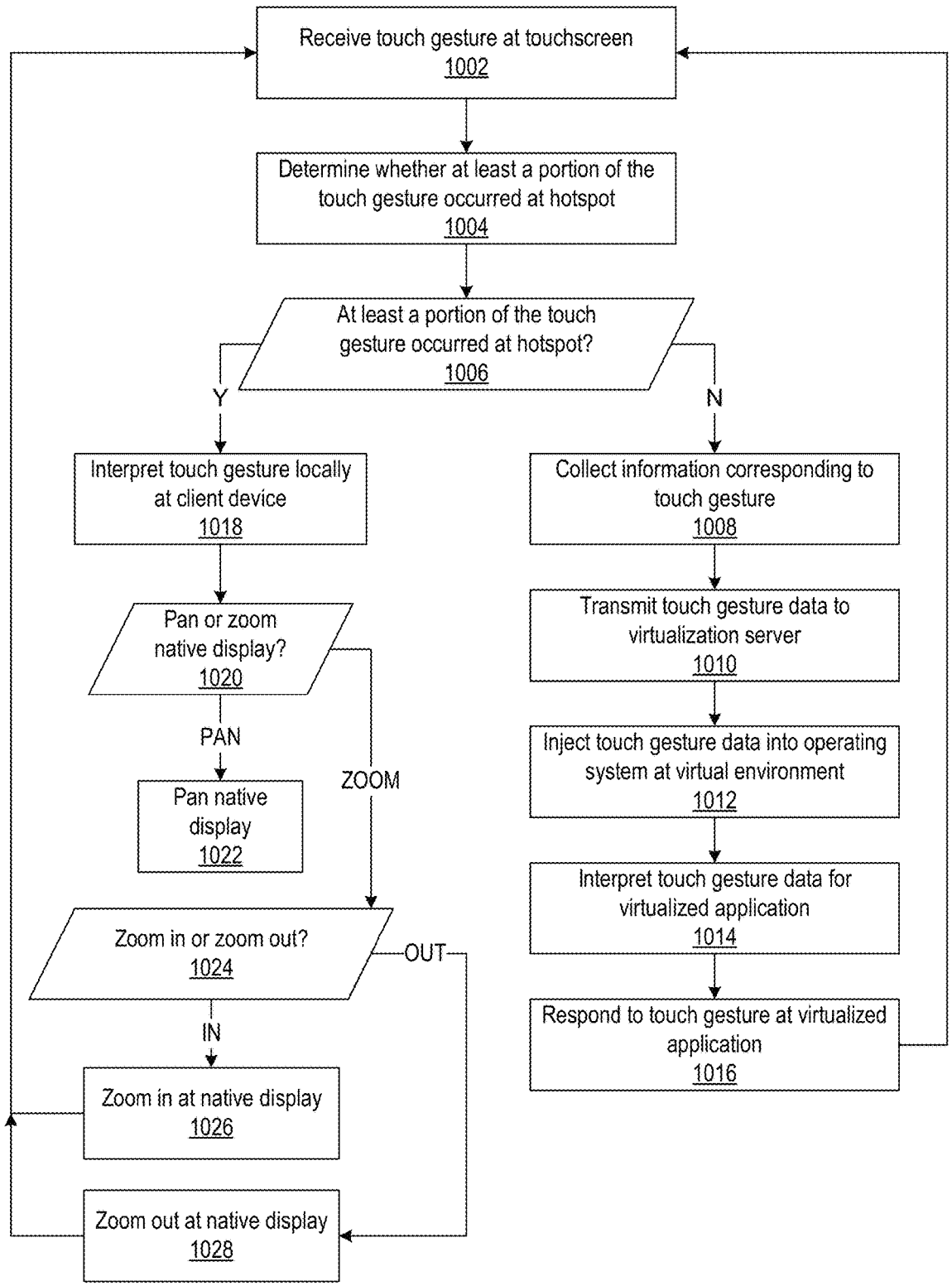
FIG. 10 depicts a flowchart of example method steps for responding to touch gestures received at a touchscreen presenting a first type of interface control element.

FIG. 10 depicts a flowchart 1000 of example method steps for responding to touch gestures received at a touchscreen presenting a first type of interface control element, e.g., a hotspot as described above with reference to FIGS. 6A-D. A virtualization client agent may operate at a touch-enabled computing device, and the client agent may connect the computing device to a virtualized application executing within a virtual environment at a virtualization server. The client agent may present the GUI of the virtualized application as a virtual display. The computing device may present the virtual display at the native display, and a user may provide input to the virtualized application via a touchscreen as touch gestures.

The computing device may receive a touch gesture at its touchscreen (block 1002). The client agent may determine whether at least a portion of the touch gesture occurred at the hotspot (block 1004). If no portion of the touch gesture occurred at the hotspot (block 1006:N), then the client agent may determine that the touch gesture should be remoted to the virtualized application. Accordingly, the client agent may collect information corresponding to the touch gesture (block 1008), and transmit the information to the virtualization server (block 1010). The touch gesture data may then be injected into the operating system of the virtual environment (block 1012) as described above. Once injected into the operating system at the virtual environment, the touch gesture data may be interpreted for the virtualized application (block 1014), and the virtualized application may respond accordingly based on the touch gesture (block 1016). As noted above, the client agent may remote touch gestures to another computing environment (e.g., a virtual computing environment) provided by the same computing device that provides the same computing environment. Accordingly, steps similar to steps 1008-1016 may be performed to provide touch gestures to a virtualized application operating in a virtual environment provided by the same computing device that provides the native computing environment.

If at least a portion of the touch gesture occurred at the hotspot (block 1006:Y), then the client agent may determine that the touch gesture should be interpreted locally (block 1018). When locally interpreting the touch gesture, the client agent may, for example, zoom or pan the native display of the computing device. Accordingly, the client agent may also determine whether the client agent should zoom or pan the native display (block 1020) in response to receipt of the touch gesture. In some example implementations, the client agent may determine whether to zoom or pan the display based on the type of touch gesture received at the native display. For example, the client agent may determine to zoom the native display in response to receipt of a pinch touch gesture or a double-tap touch gesture and may determine to pan the display in response to receipt of a pan touch gesture. As described above, the client agent may determine to zoom in at the native display in response to receipt of a pinch open touch gesture where a portion of the pinch open touch gesture occurs at the hotspot and another portion of the pinch open touch gesture does not occur at the hotspot. The client agent may also determine to zoom out at the native display in response to receipt of a pinch close touch gesture where a portion of the pinch close touch gesture occurs at the hotspot and another portion of the pinch close touch gesture does not occur at the hotspot. The client agent may further determine to adjust a zoom level to be 100% when the zoom level is above 100% and a double-tap touch gesture received at the hotspot and determine to adjust a zoom level of the native display to be above 100% when the zoom level is at 100% and a double-tap touch gesture is received at the hotspot.

If the client agent determines to pan the native display (block 1020:PAN), then the client agent may pan the native display (block 1022) as described above. If the client agent determines to zoom the native display (block 1020:ZOOM), then the client agent may zoom the native display as also described above. Furthermore, the client agent may determine whether to zoom in or zoom out at the native display (block 1024). In some example implementations, the client agent may determine whether to zoom in or zoom out based on the zoom level of the native display. For example, the client agent may determine to zoom in at the native display when the zoom level is 100% and determine to zoom out at the native display when the zoom level is greater than 100%. If the client agent determines to zoom in at the native display (block 1024:IN), then the client agent may zoom in at the native display (block 1026) as described above. If the client agent determines to zoom out at the native display (block 1024:OUT), then the client agent may zoom out at the native display (block 1028) as also described above. The client agent may repeat steps 1002-1028 as additional touch gestures are received at the computing device. It will be appreciated that the client agent may employ additional or alternative workflows to respond to touch gestures received at the computing device.

Figure 11:
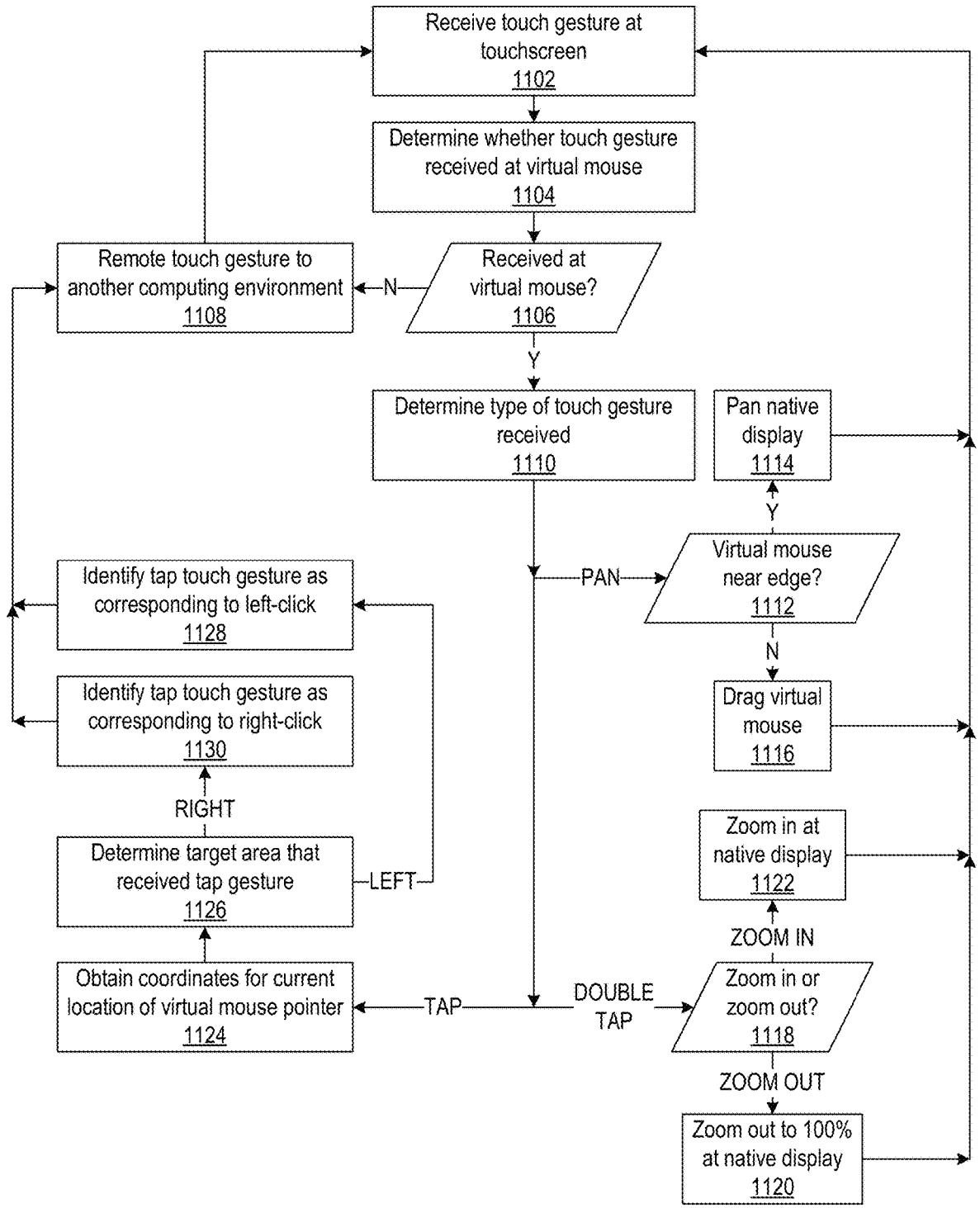
FIG. 11 depicts a flowchart of example method steps for responding to touch gestures received at a touchscreen presenting a second type of interface control element.

FIG. 11 is a flowchart 1100 of example methods steps for responding to touch gestures received at a touchscreen presenting a second type of interface control element, e.g., a virtual mouse as described above with reference to FIGS. 7A-C. The touchscreen of a computing device may receive a touch gesture (block 1102), and the client agent may determine if the touch gesture occurred at the virtual mouse (block 1104). If no portion of the touch gesture occurred at the virtual mouse (block 1106:N), then the client agent may remote the touch gesture to another computing environment (block 1108) as described above. Steps similar to steps 1008-1016 described above with reference to FIG. 10 may be performed to remote the touch gesture to the other computing environment, which may be provided by the same computing device that provides the native computing environment or to a remote computing device in signal communication with the computing device that provides the native computing environment. If, however, the touch gesture occurred at the virtual mouse (block 1106:Y), then the client agent may determine the type of touch gesture that occurred (block 1110).

If the touch gesture received at the virtual mouse is a pan touch gesture (block 1110:PAN), then the client agent may determine whether the virtual mouse is positioned at the edge of the native display (block 1112). The virtual mouse may be repositionable within the native display and may be used to pan the native display when the native display is zoomed in. A user may both reposition the virtual mouse and pan the native display with the virtual mouse via a pan touch gesture. Accordingly, if the virtual mouse is near an edge of the native display (block 1112:Y), then the client agent may pan the native display in the direction of the pan touch gesture (block 1114). If, however, the virtual mouse is not near an edge of the native display (block 1112:N), then the client agent may drag the virtual mouse within the native display in the direction of the pan touch gesture (block 1116). Having responded to the pan touch gesture received, the client agent may wait to receive another touch gesture at the touchscreen (block 1102).

If the touch gesture received at the virtual mouse is a double-tap touch gesture (block 1110:DOUBLE-TAP), then the client agent may determine whether to zoom in or zoom out at the native display (block 1118). As noted above, the double-tap touch gesture may be received at a zoom target area of the virtual mouse. If the zoom level of the native display is above 100% when the double-tap touch gesture is received at the virtual mouse, then the client agent may determine to zoom out at the native display (block 1118: ZOOM OUT). The client agent may thus zoom out at the native display by adjusting the zoom level of the native display to be 100% (block 1120). If the zoom level of the native display is below 100% when the double-tap touch gesture is received at the virtual mouse, then the client agent may determine to zoom in at the native display (block 1118:ZOOM IN). The client agent may zoom in at the native display (block 1122) also by adjusting the zoom level of the native display to be 100%. The client agent may also determine to zoom in at the native display (block 1118: ZOOM IN) when the zoom level of the native display is at 100%. When the current zoom level of the native display is at 100%, the client may zoom in at the native display (block 1122) by adjusting the zoom level to be above 100% (e.g., 150%). Having responded to the double-tap touch gesture received, the client agent may wait to receive another touch gesture at the touchscreen (block 1102).

If the touch gesture received at the virtual mouse is a tap touch gesture (block 1110:TAP), then the client agent may obtain the coordinates of the current location of the pointer of the virtual mouse (block 1124). As described above, a user may utilize the pointer of the virtual mouse to select various GUI elements of the virtual display. As also noted above, the virtual mouse may include a left-click target area and a right-click target area. Accordingly, the client agent may determine which target area the tap touch gesture occurred at (block 1126). As also described above, the client agent may configure the touch gesture information remoted to another computing environment based on which target area received the tap touch gesture. Accordingly, when the tap touch gesture occurs at the left-click target area (block 1126:LEFT), the client agent may identify the tap touch gesture as corresponding to a left-click of a physical pointing device (block 1128) when configuring the touch gesture information to send to the other computing environment. When the tap touch gesture occurs at the right-click target area (block 1126:RIGHT), the client agent may identify the tap touch gesture as corresponding to a right-click of a physical pointing device (block 1130) when configuring the touch gesture information to send to the other computing environment. Having configured the touch gesture information, the client agent may remote the touch gesture to the other computing environment (block 1108) by transmitting the touch gesture information to the other computing environment.

Figure 12:
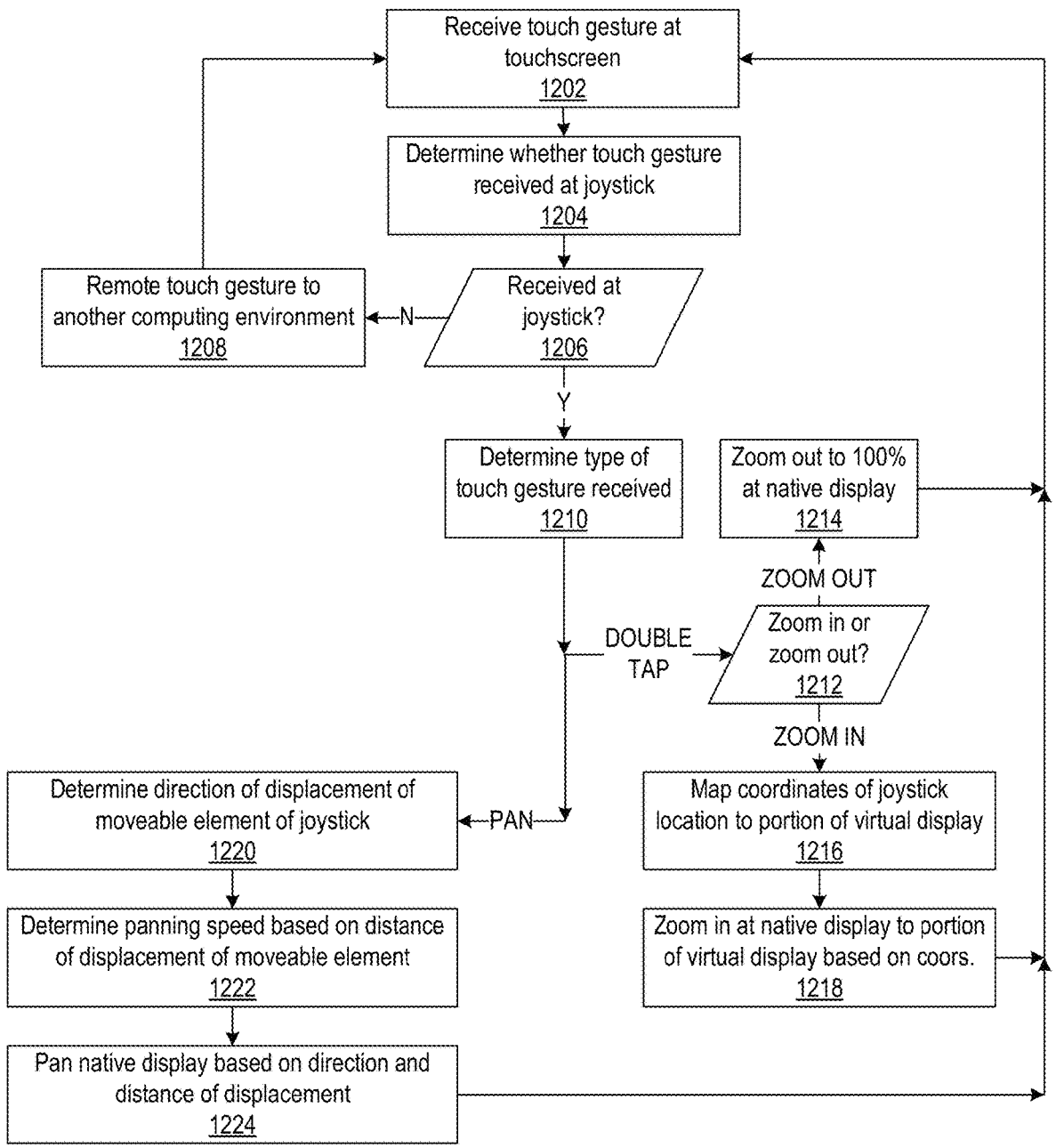
FIG. 12 depicts a flowchart of example method steps for responding to touch gestures received at a touchscreen presenting a third type of interface control element.

FIG. 12 is a flowchart 1200 of example method steps for responding to touch gestures received at a touchscreen presenting a third type of interface control element, e.g., a joystick as described above with reference to FIGS. 8A-C. The touchscreen of a computing device may receive a touch gesture (block 1202), and the client agent may determine if the touch gesture occurred at the joystick (block 1204). If no portion of the touch gesture occurred at the joystick (block 1206:N), then the client agent may remote the touch gesture to another computing environment (block 1208) as described above. Steps similar to steps 1008-1016 described above with reference to FIG. 10 may be performed to remote the touch gesture to the other computing environment. If, however, the touch gesture occurred at the joystick (block 1206:Y), then the client agent may determine the type of touch gesture that occurred (block 1210).

If the touch gesture received at the joystick is a double-tap touch gesture (block 1210:DOUBLE-TAP), then the client agent may determine whether to zoom in or zoom out at the native display (block 1212). If the zoom level of the native display is above 100% when the double-tap touch gesture is received at the joystick, then the client agent may determine to zoom out at the native display (block 1212:ZOOM OUT).

The client agent may thus zoom out at the native display by adjusting the zoom level of the native display to be 100% (block 1214). If the zoom level of the native display is below 100% when the double-tap touch gesture is received at the joystick, then the client agent may determine to zoom in at the native display (block 1212:ZOOM IN). The client agent may similarly zoom in at the native display also by adjusting the zoom level of the native display to be 100%. The client agent may also determine to zoom in at the native display (block 1212:ZOOM IN) when the zoom level of the native display is at 100%. As described above, the client agent may map the coordinates of the location on the joystick the touch gesture occurred at to a portion of the virtual display to zoom to (block 1216). The client agent may then zoom to the portion of the virtual display based on the coordinates mapped to that portion (block 1218). As one example, the client agent may map double-tap touch gestures received at an upper-right quadrant of the joystick to an upper right-portion of the virtual display. Having responded to the double-tap touch gesture received, the client agent may wait to receive another touch gesture at the touchscreen (block 1202).

If the touch gesture received at the joystick is a pan touch gesture (block 1210:PAN), then the client agent may determine to pan the native display when the native display is zoomed in. As described above, the client agent may pan the native display based on based on the displacement of the moveable element of the joystick relative to the stationary element of the joystick that surrounds the moveable element. Accordingly, the client agent may determine a direction of displacement of the moveable element (block 1220) as well as a panning speed based on a distance of displacement of the moveable element (block 1222). As also described above, the client agent may determine a panning speed based on the distance between the respective centers of the moveable element and the stationary element. The client agent may thus pan the native display based on the direction of displacement and the panning speed (1224). Having responded to the pan touch gesture received, the client agent may wait to receive another touch gesture at the touchscreen (block 1202).

Figure 13:
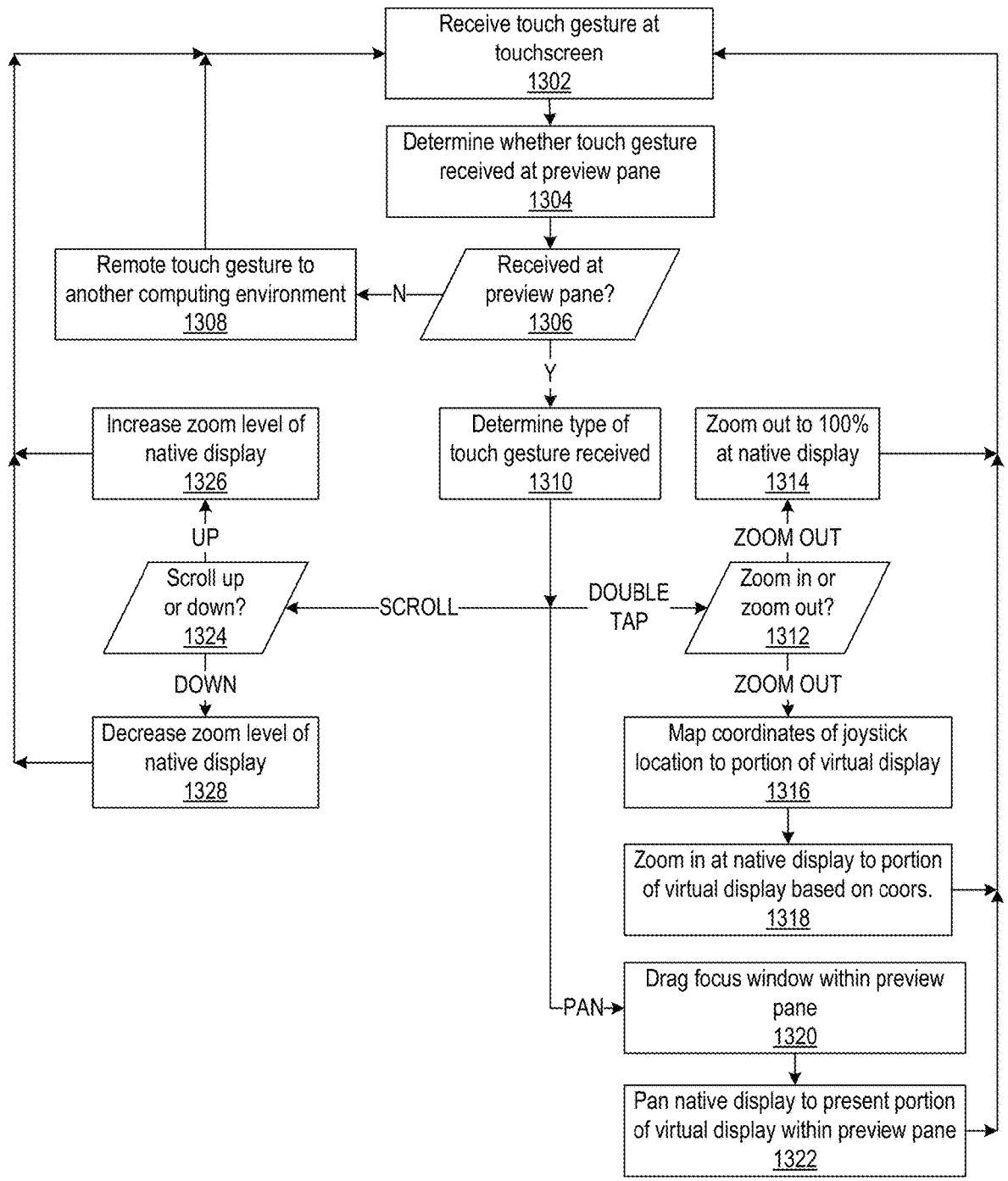
FIG. 13 depicts a flowchart of example method steps for responding to touch gestures received at a touchscreen presenting a fourth type of interface control element.

FIG. 13 is a flowchart 1300 of example method steps for responding to touch gestures received at a touchscreen presenting a fourth type of interface control element, e.g., a preview pane as described above with reference to FIGS. 9A-C. The touchscreen of a computing device may receive a touch gesture (block 1302), and the client agent may determine if the touch gesture occurred at the preview pane (block 1304). If no portion of the touch gesture occurred at the preview pane (block 1306:N), then the client agent may remote the touch gesture to another computing environment (block 1308) as described above. Steps similar to steps 1008-1016 described above with reference to FIG. 10 may be performed to remote the touch gesture to the other computing environment. If, however, the touch gesture occurred at the preview pane (block 1206:Y), then the client agent may determine the type of touch gesture that occurred (block 1210).

If the touch gesture received at the preview pane is a double-tap touch gesture (block 1310:DOUBLE-TAP), then the client agent may determine whether to zoom in or zoom out at the native display (block 1312). If the zoom level of the native display is above 100% when the double-tap touch gesture is received at the preview pane, then the client agent may determine to zoom out at the native display (block 1312:ZOOM OUT). The client agent may thus zoom out at the native display by adjusting the zoom level of the native display to be 100% (block 1314). If the zoom level of the native display is below 100% when the double-tap touch gesture is received at the preview pane, then the client agent may determine to zoom in at the native display (block 1312:ZOOM IN). The client agent may similarly zoom in at the native display also by adjusting the zoom level of the native display to be 100%. The client agent may also determine to zoom in at the native display (block 1312:ZOOM IN) when the zoom level of the native display is at 100%. As described above, the client agent may map the coordinates of the location on the preview pane the touch gesture occurred at to a portion of the virtual display to zoom to (block 1316). The client agent may then zoom to the portion of the virtual display based on the coordinates mapped to that portion (block 1318). As one example, the client agent may map double-tap touch gestures received at an upper-right portion of the preview pane to an upper-right portion of the virtual display. Having responded to the double-tap touch gesture received, the client agent may wait to receive another touch gesture at the touchscreen (block 1202).

As described above, the client agent may determine the portion of the virtual display to zoom to based on the position of a focus window within the preview pane. A user may drag the focus window to reposition the focus window within the preview pane. Accordingly in response to receipt of a pan touch gesture at the focus window of the preview pane (block 1310:PAN), the client agent may drag the focus window within the preview pane (block 1320) based on the direction of the pan touch gesture. As the focus window is repositioned within the preview pane, the client agent may pan the native display to present the portion of the virtual display within the focus window of the preview pane (block 1322). Having responded to the pan touch gesture received, the client agent may wait to receive another touch gesture at the touchscreen (block 1202).

As also described above, the preview pane may include a slider for adjusting the zoom level of the native display. A user may perform a scroll touch gesture at the slider of the preview pane to drag the slider up or down. If the touch gesture received at the touchscreen is a scroll touch gesture that occurs at the slider of the preview pane (block 1310:SCROLL), then the client agent may determine the direction of the scroll touch gesture (block 1324), e.g., up or down. If the scroll touch gesture drags the slider upward (block 1324:UP), then the client agent may increase the zoom level of the native display (block 1326). If the scroll touch gesture drags the slider downward (block 1324:DOWN), then the client agent may decrease the zoom level of the native display. Having responded to the scroll touch gesture received, the client agent may wait to receive another touch gesture at the touchscreen (block 1202).

In view of the description above, it will be appreciated that aspects of the present disclosure advantageously improve the user experience at touch-enabled computing devices when remotely accessing virtualized applications. As demonstrated above, the various interface control elements minimize errors when receiving user input by providing a target area at which to receive touch gestures that should be interpreted locally. Moreover, the interface control elements enable a user to zoom and pan the native display thereby improving the readability of text and the selectability of GUI elements at the interface.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein. Computer-readable media as used in this disclosure includes all non-transitory computer-readable media and excludes transitory computer readable media such as propagating signals.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, the steps illustrated in the illustrative figures may be performed in other than the recited order, and one or more steps illustrated may be optional in accordance with aspects of the disclosure.

What is claimed is:

1. A method comprising:
   presenting, using a first graphical user interface of an operating system of a first computing device and at a display of the first computing device, a second graphical user interface of an application executing in a remote computing environment provided by a second computing device;
   presenting, using the first graphical user interface and at the display of the first computing device, a preview pane comprising a miniature view of the second graphical user interface of the application executing in the remote computing environment, wherein the miniature view of the second graphical user interface is smaller than the second graphical user interface presented at the display;
   based on receiving first touch input, at a touchscreen of the first computing device and within the preview pane, adjusting a zoom level of the display of the first computing device; and
   based on receiving second touch input, at the touchscreen and not within the preview pane, remoting, to the remote computing environment, the second touch input.

2. The method of claim 1, wherein the preview pane comprises a native interface element that receives the first touch input.

3. The method of claim 1, wherein:
   the preview pane comprises a native interface element that receives the first touch input;
   the native interface element comprises a bar and a slider; and
   the zoom level of the display corresponds to a position of the slider along the bar.

4. The method of claim 1, further comprising, based on increasing the zoom level of the display, presenting, within the preview pane a window, wherein the window surrounds a portion of the miniature view of the second graphical user interface, and wherein the portion of the miniature view of the second graphical user interface surrounded by the window corresponds to a portion of the second graphical user interface.

5. The method of claim 4, further comprising, based on receiving third touch input at the touchscreen:
   moving the window within the preview pane to surround a different portion of the miniature view of the second graphical user interface; and
   presenting, at the display, a different portion of the second graphical user interface that corresponds to the different portion of the miniature view of the second graphical user interface that is surrounded by the window.

6. The method of claim 1, further comprising:
   determining a first set of coordinates associated with the first touch input received within the preview pane;
   determining, based on the first set of coordinates, a second set of coordinates associated with the second graphical user interface presented at the display;
   determining, based on the second set of coordinates, a portion of the second graphical user interface to zoom to; and
   wherein the adjusting the zoom level of the display comprises increasing the zoom level of the display and presenting the portion of the second graphical user interface determined.

7. The method of claim 1, wherein the first touch input comprises a double-tap touch gesture.

8. The method of claim 1, further comprising, based on increasing the zoom level of the display, modifying a border of the preview pane.

9. The method of claim 1, wherein the adjusting the zoom level of the display comprises increasing the zoom level of the display, and further comprising, based on receiving third touch input at the touchscreen and within the preview pane, decreasing the zoom level of the display.

10. The method of claim 1, wherein:
    the preview pane is overlaid on the display; and
    the preview pane is semi-transparent.

11. The method of claim 1, wherein the remoting the second touch input to the remote computing environment causes at least one of the remote computing environment or the application executing in the remote computing environment to respond to the second touch input.

12. A computing device comprising:
    at least one processor;
    a touchscreen comprising a display;
    an operating system; and
    memory storing executable instructions that, when executed by the at least one processor, cause the computing device to:
       present, using a first graphical user interface of the operating system and at the display, a second graphical user interface of an application executing in a remote computing environment provided by another computing device;
       present, using the first graphical user interface and at the display of the computing device, a preview pane comprising a miniature view of the second graphical user interface of the application executing in the remote computing environment, wherein the miniature view of the second graphical user interface is smaller than the second graphical user interface presented at the display;

based on receiving first touch input, at the touchscreen and within the preview pane, adjust a zoom level of the display of the computing device; and based on receiving second touch input, at the touchscreen and not within the preview pane, remoting, to the remote computing environment, the second touch input.

13. The computing device of claim 12, wherein the preview pane comprises a native interface element that receives the first touch input.

14. The computing device of claim 12, wherein:
the preview pane comprises a native interface element that receives the first touch input;
the native interface element comprises a bar and a slider; and
the zoom level of the display corresponds to a position of the slider along the bar.

15. The computing device of claim 12, wherein the instructions, when executed, further cause the computing device to, based on increasing the zoom level of the display, present, within the preview pane a window, wherein the window surrounds a portion of the miniature view of the second graphical user interface, and wherein the portion of the miniature view of the second graphical user interface surrounded by the window corresponds to a portion of the second graphical user interface.

16. The computing device of claim 15, wherein the instructions, when executed, further cause the computing device to, based on receiving third touch input at the touchscreen:
move the window within the preview pane to surround a different portion of the miniature view of the second graphical user interface; and
present, at the display, a different portion of the second graphical user interface that corresponds to the different portion of the miniature view of the second graphical user interface that is surrounded by the window.

17. The computing device of claim 12, wherein the instructions, when executed, further cause the computing device to:
determine a first set of coordinates associated with the first touch input received within the preview pane;
determine, based on the first set of coordinates, a second set of coordinates associated with the second graphical user interface presented at the display;
determine, based on the second set of coordinates, a portion of the second graphical user interface to zoom to; and
adjust the zoom level of the display at least by:
increasing the zoom level of the display; and
presenting the portion of the second graphical user interface determined.

18. The computing device of claim 12, wherein the first touch input comprises a double-tap touch gesture.

19. The computing device of claim 12, wherein the instructions, when executed, further cause the computing device to, based on increasing the zoom level of the display, modify a border of the preview pane.

20. The computing device of claim 12, wherein:
the instructions, when executed, cause the computing device to adjust the zoom level of the display at least by increasing the zoom level of the display; and
the instructions, when executed, further cause the computing device to, based on receiving third touch input at the touchscreen and within the preview pane, decrease the zoom level of the display.

21. The computing device of claim 12, wherein:
the preview pane is overlaid on the display; and
the preview pane is semi-transparent.

22. The computing device of claim 12, wherein the remoting the second touch input to the remote computing environment causes at least one of the remote computing environment or the application executing in the remote computing environment to respond to the second touch input.

23. A non-transitory computer-readable storage medium storing executable instructions that, when executed by at least one processor of a computing device, cause the computing device to:
present, using a first graphical user interface of an operating system of the computing device and at a display of the computing device, a second graphical user interface of an application executing in a remote computing environment provided by another computing device;
present, using the first graphical user interface and at the display of the computing device, a preview pane comprising a miniature view of the second graphical user interface of the application executing in the remote computer environment, wherein the miniature view of the second graphical user interface is smaller than the second graphical user interface presented at the display;
based on receiving first touch input, at a touchscreen of the computing device and within the preview pane, adjust a zoom level of the display of the computing device; and
based on receiving second touch input, at the touchscreen and not within the preview pane, remoting, to the remote computing environment, the second touch input.

24. The non-transitory computer-readable storage medium of claim 23, wherein the preview pane comprises a native interface element that receives the first touch input.

25. The non-transitory computer-readable storage medium of claim 23, wherein:
the preview pane comprises a native interface element that receives the first touch input;
the native interface element comprises a bar and a slider; and
the zoom level of the display corresponds to a position of the slider along the bar.

26. The non-transitory computer-readable storage medium of claim 23, wherein the instructions, when executed, further cause the computing device to, based on increasing the zoom level of the display, present, within the preview pane a window, wherein the window surrounds a portion of the miniature view of the second graphical user interface, and wherein the portion of the miniature view of the second graphical user interface surrounded by the window corresponds to a portion of the second graphical user interface.

27. The non-transitory computer-readable storage medium of claim 26, wherein the instructions, when executed, further cause the computing device to, based on receiving third touch input at the touchscreen:
move the window within the preview pane to surround a different portion of the miniature view of the second graphical user interface; and
present, at the display, a different portion of the second graphical user interface that corresponds to the different portion of the miniature view of the second graphical user interface that is surrounded by the window.

28. The non-transitory computer-readable storage medium of claim 23, wherein the instructions, when executed, further cause the computing device to:
  determine a first set of coordinates associated with the first touch input received within the preview pane;
  determine, based on the first set of coordinates, a second set of coordinates associated with the second graphical user interface presented at the display;
  determine, based on the second set of coordinates, a portion of the second graphical user interface to zoom to; and
  adjust the zoom level of the display at least by:
    increasing the zoom level of the display; and
    presenting the portion of the second graphical user interface determined.

29. The non-transitory computer-readable storage medium of claim 23, wherein the first touch input comprises a double-tap touch gesture.

30. The non-transitory computer-readable storage medium of claim 23, wherein the instructions, when executed, further cause the computing device to, based on increasing the zoom level of the display, modify a border of the preview pane.

31. The non-transitory computer-readable storage medium of claim 23, wherein:
  the instructions, when executed, cause the computing device to adjust the zoom level of the display at least by increasing the zoom level of the display; and
  the instructions, when executed, further cause the computing device to, based on receiving third touch input at the touchscreen and within the preview pane, decrease the zoom level of the display.

32. The non-transitory computer-readable storage medium of claim 23, wherein:
  the preview pane is overlaid on the display; and
  the preview pane is semi-transparent.

33. The non-transitory computer-readable storage medium of claim 23, wherein the remoting the second touch input to the remote computing environment causes at least one of the remote computing environment or the application executing in the remote computing environment to respond to the second touch input.

\* \* \* \* \*